(12) United States Patent
Besecker et al.

(10) Patent No.: US 12,475,660 B2
(45) Date of Patent: Nov. 18, 2025

(54) AUGMENTED REALITY ACTIVATION PLATFORM

(71) Applicant: Magnetic Mobile, LLC, Miamisburg, OH (US)

(72) Inventors: Bret J. Besecker, St. Petersburg, FL (US); Steven D. Messer, Dayton, OH (US); Paul J. Militello, Port Orange, FL (US); Jessica M. Sparks, Beavercreek, OH (US); Brian J. Sichi, Oconomowoc, WI (US)

(73) Assignee: Magnetic Mobile, LLC, Miamisburg, OH (US)

( * ) Notice: Subject to any disclaimer, the term of this patent is extended or adjusted under 35 U.S.C. 154(b) by 276 days.

(21) Appl. No.: 18/297,874

(22) Filed: Apr. 10, 2023

(65) Prior Publication Data

US 2023/0343048 A1 Oct. 26, 2023

Related U.S. Application Data

(60) Provisional application No. 63/334,510, filed on Apr. 25, 2022.

(51) Int. Cl.
*G06T 19/00* (2011.01)
*G06Q 30/0241* (2023.01)
*G06Q 30/0601* (2023.01)
*G06T 15/00* (2011.01)

(52) U.S. Cl.
CPC ....... *G06T 19/006* (2013.01); *G06Q 30/0643* (2013.01); *G06T 15/005* (2013.01)

(58) Field of Classification Search
None
See application file for complete search history.

(56) References Cited

U.S. PATENT DOCUMENTS

2019/0107990 A1* 4/2019 Spivack ............... G06T 11/60
2021/0279914 A1* 9/2021 Shoup .................. G06Q 10/20

* cited by examiner

*Primary Examiner* — Michael J Cobb
(74) *Attorney, Agent, or Firm* — Sheppard Mullin Richter & Hampton LLP

(57) ABSTRACT

Systems and methods for generating and providing multiple, independent 3D objects in an augmented reality (AR) environment are described. One aspect of some embodiments relate to an augmented reality technology activation platform that enables the creation of interactive message 3D objects (e.g., static images, animations, product information and offers, etc.) and product 3D objects (e.g., product images, descriptions, etc.). These two types of 3D objects can be displayed at a user device so that customized, interactive messages associated with the product are displayed with the product, where the interactive messages are rendered (e.g., as a 3D object) along with the product 3D object in the same scene (e.g., as opposed to being layered on top of the 3D environment or augmented reality image).

12 Claims, 18 Drawing Sheets

AUGMENTED REALITY ACTIVATION PLATFORM

TECHNICAL FIELD

The disclosed technology relates generally to generating augmented reality (AR) objects and animations, and incorporating AR technology with the generated objects and animations.

BACKGROUND

Existing systems for displaying interactive messages associated with a three-dimensional (3D) rendering of a product suffer from various limitations. For example, the way in which interactive messages are created and associated with a 3D product display (e.g., in augmented reality (AR), virtual reality (VR), mixed reality (XR) and other 3D product displays) leads to various drawbacks and limitations. Typically, the 3D object is created by one technology platform and the interactive messages are generated by another. The interactive messages are often overlaid on the 3D rendering of the product as a separate layer of the display. This technical approach leads to various drawbacks.

One example is described in U.S. Patent Publication Number 2014/0100997 which states a method, in part, comprising: determining, from an augmented reality three dimensional model of a shopping display, a two dimensional overlay that includes an augmented reality marker corresponding to a physical item visible in the two dimensional image, and displaying, via a screen on a mobile device, an augmented reality view of the shopping display. The augmented reality view includes the two dimensional image and the two dimensional overlay presented together such that the augmented reality marker is associated with the physical item in the augmented reality view. A selection of the augmented reality marker is received via a user input on the screen, and an item page corresponding to the physical item is presented on the screen of the mobile device in response to the received selection. The item page includes additional information about at least one of the physical item and a good or service represented by the physical item.

Among other drawbacks, this approach requires the user to navigate away from the 3D product display application and to a separate product description page (e.g., a separate webpage).

Among other things, this traditional approach may require the consumer to go into and out of the 3D environment in order to obtain the additional information. Additionally, in many cases, it may be difficult to create or modify the interactive message and associate it with the 3D product display. These and other limitations and drawbacks exist with this type of technical approach.

BRIEF SUMMARY OF EMBODIMENTS

Various embodiments of the invention improve on such traditional systems by employing a different technical approach to providing interactive messages with 3D product displays. One aspect of some embodiments relate to an augmented reality technology activation platform that enables the creation of interactive message 3D objects (e.g., static images, animations, product information and offers, etc.) and product 3D objects (e.g., product images, descriptions, etc.). These two types of 3D objects can be displayed at a user device so that customized, interactive messages associated with the product are displayed with the product, where the interactive messages are rendered (e.g., as a 3D object) along with the product 3D object in the same scene (e.g., as opposed to being layered on top of the 3D environment or augmented reality image). The interactive message 3D object may be associated with the product 3D object by being juxtaposed within the scene with the product 3D object (e.g., so that the interactive message is displayed as an independent 3D object in proximity to the product 3D object) or it may be anchored to the product 3D object.

Other aspects of the disclosure relate to a system for 3D product and interactive messaging campaign creation and management platform. According to some embodiments, this platform may include a cloud-based computer system, comprising a self-managed campaign portal including a campaign designer component, a 3D asset importer and management module, a set of pre-stored message templates, a 3D pipeline and workflow management component, and one or more storage devices. In some examples, instead of using a set of pre-stored message templates, the platform may include custom non-templated information or offers.

The self-managed campaign portal correlates one or more 3D assets (e.g., as an image object) with interactive message parameters (e.g., duration/expiration, image/objects used, links to external sources), where the interactive message parameters can be defined within the portal and used to generate an interactive message 3D object. The portal may provide the correlated data to a creator's website for a consumer to interact with in parallel. The portal may also enable the creator to create and manage interactive messages directly within the 3D asset that the creator may upload via the 3D asset importer and management module. In some examples, the platform may provide a preview display of the interactive message 3D object and the product 3D object prior to providing the integrated file.

The campaign message designer component enables the creator to select one or more of the pre-stored message templates and/or customize a template using various parameters associated with the template. Once the template is defined for a 3D asset, the template may be populated with the parameters and used to display information (e.g., images or product descriptions) with the product. The pre-stored message template may enable the creator to select a layout or other visual features (via the message designer component) to automatically organize digital 3D objects on a webpage for the consumer.

When a template is not used, the platform may include custom non-templated information or offers. Using this option, the user may upload images to the system in a pre-defined file format that is incorporated with the platform as a 3D asset or other 3D object to display on a webpage for the consumer.

The 3D asset importer and management module enables the creator to upload, revise, delete, or otherwise manage 3D assets that are used to create digital objects. The 3D asset may correspond with a physical product to acquire by a consumer by displaying a 3D image of the product. In some examples, the 3D asset may be linked with one or more interactive message 3D objects to display the interactive message or other data.

The 3D pipeline and workflow management component enables the creator to define parameters for purchase, shipping, return, and other workflows related to the product.

The storage devices may be implemented remotely in a cloud environment or locally at a creator's device to store data related to components described herein. For example, the storage devices can store one or more 3D assets, interactive message parameters, or other information provided by the creator through the 3D asset importer and management module or self-managed campaign portal.

In operation, the platform may receive (e.g., via upload) product display assets (e.g., 2D images, 3D images or other product display assets). As one example, we may assume the product information is received from a retailer associated with a product displayed on the retailer's website. Other use cases are also envisioned. The product display assets may be processed via 3D pipeline and workflow management process (described below) to generate 3D assets that may be stored for later use. Among other things, the 3D pipeline and workflow management process may enable the creator to associate various metadata with the 3D asset. Additionally, the creator may specify a set of interactive messages to be selectively displayed with the 3D product display (e.g., on the retailer's website or other display locations). For example, the system may store a set of interactive message templates that enables pre-packaged 3D objects that include the offer and product that are viewable in 3D at the retailer's website by the consumer. When one of the set of 3D marketing offers is selected, the corresponding offer data is applied to the purchase transaction of the product.

The system provides a set of technology tools to enable the creator to create and manage the interactive messages directly within the 3D asset itself, including the ability to create an independent interactive message 3D object and/or set interactive message parameters. The creator may select one or more of the pre-stored message templates to be used with the product and then customize various parameters of the template. For example, if the interactive message is an offer associated with the product, the system may enable the creator to set expiration, delivery, and segmentation-based parameters on each message (as further detailed below).

The platform may provide step-by-step instructions through the workflow process implemented by the platform to set up the interactive messaging campaigns using the 3D objects. Once the campaigns are set in the portal with the required metadata for the message, these may be appended to the product 3D object asset file, using an integration processor, and merged with the 3D asset back into the final GLTF or USDz file format, prior to final processing and packaging. Once the files are ready, the creator can get an alert message via SMS, system alert, or email message workflow to download the file packages for distribution on their own PDP pages. In the system alert scenario, users may receive a notification of a status in a dashboard-style interface via the platform.

Thus, once the interactive message parameters are set, the platform may enable the interactive message(s) for a product to be associated with the 3D assets (e.g., as created in the 3D pipeline and workflow management component). The platform integrates the product 3D object, interactive message 3D objects, and the interactive message parameters into an integrated data structure. The platform then outputs the integrated data structure for use by the creator (e.g., the retailer for use in connection with the retailer's website including product display pages). In this way, the integrated file includes the 3D product image with 3D message parameters that are rendered with the 3D product image according to the creator's chosen options as a 3D object.

Based on this technical approach to setting up the interactive messages, the interactive message can be rendered as a 3D object along with the product 3D object. This approach also enables a variety of display options. By way of example, the interactive message 3D object may be integrated into the 3D scene along with the associated product 3D object, such that as the product image rotates, the interactive message 3D object may rotate along with the product image. Additionally, by anchoring an interactive message 3D object to a product 3D object, if there are multiple items in a rendered scene, specific messages can be anchored with individual items in the rendered scene.

According to other display options, an interactive message 3D object can be selectively animated such that it can move relative to the associated product image (e.g., the message may drop down from the top of the display and the be located in juxtaposition to the associated 3D product image (with or without thereafter being anchored thereto). Thus, the interactive message 3D object can be anchored to the product 3D object or located alongside the product image.

In examples where the complete file is transmitted (e.g., from the retailer website) to a second user (end user mobile device), no downloadable application may be required.

Additional data may be incorporated with the interactive message 3D object, including supplemental images to expedite activation of an offer or initiate a purchase transaction. For example, a barcode, QR code, or coupon code may direct the consumer to the particular product and offer, depending on the creator's preferred integration path.

Once the end-user activates the interactive message 3D object corresponding with the offer, offer details are presented in the scene (e.g., as an overlay or incorporated as a 3D image of the product and the 3D image of the interactive message). The offer details associated with the activated interactive message 3D object are transmitted from an storage device associated with the self-managed campaign portal to the website and presented alongside the 3D asset and interactive message that are displayed in the scene. The website may direct the consumer to purchase the corresponding product by displaying a unique offer code only visible to users in the 3D AR scene.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Figure 1:
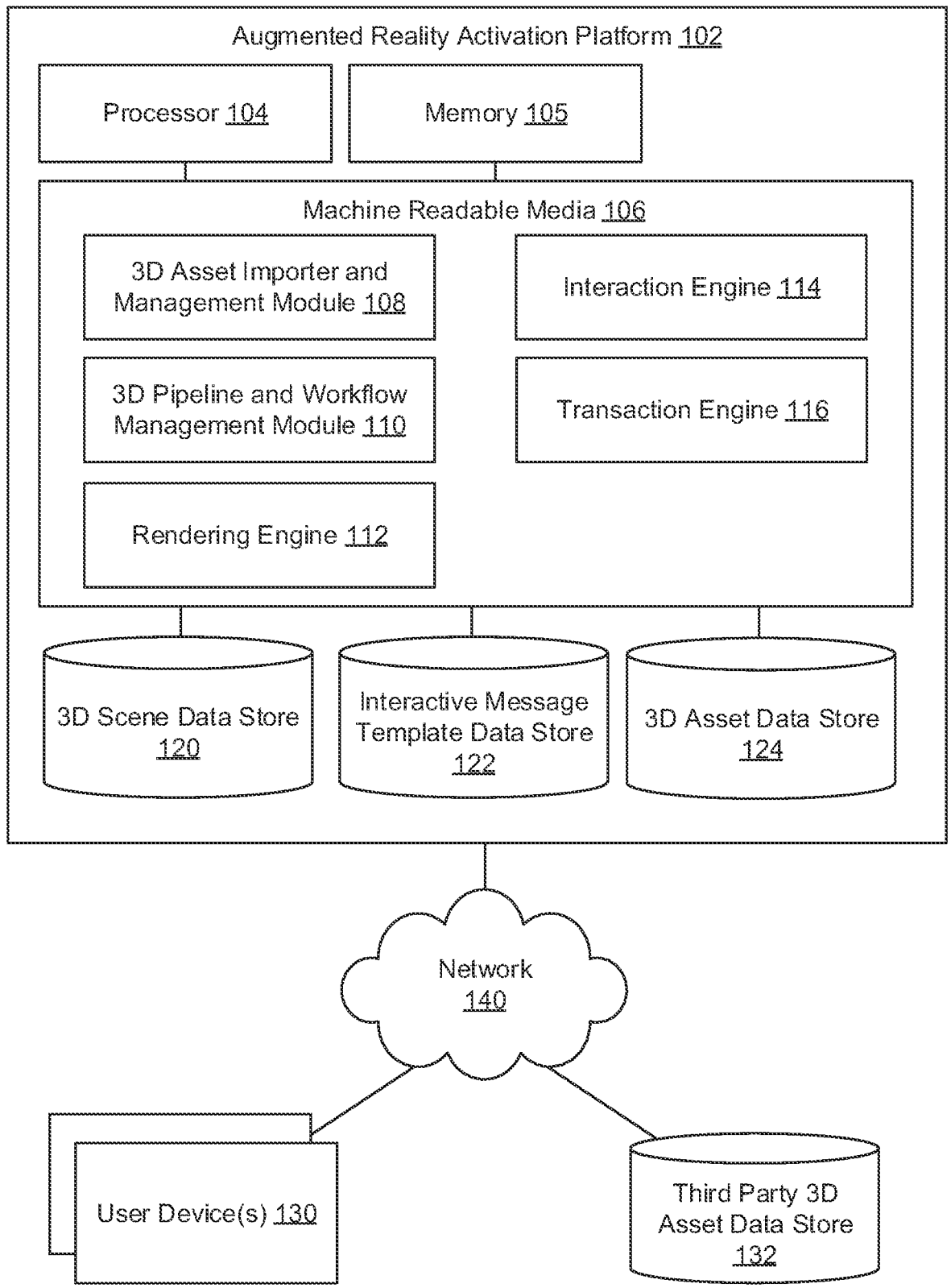
FIG. 1 illustrates an augmented reality (AR) activation platform, user devices, and network, in accordance with the embodiments disclosed herein.

FIG. 1 illustrates an augmented reality (AR) activation platform, user devices, and network, in accordance with the embodiments disclosed herein. In this illustration, augmented reality activation platform 102, user device(s) 130, and third party 3D asset data store 132 may communicate via network 140 in a distributed communication environment.

Memory 105 may comprise random-access memory (RAM) or other dynamic memory for storing information and instructions to be executed by processor 104. Memory 105 might also be used for storing temporary variables or other intermediate information during execution of instructions to be executed by processor 104. Memory 105 may also comprise a read only memory ("ROM") or other static storage device coupled to a bus for storing static information and instructions for processor 104.

Processor 104 may comprise a general-purpose or special-purpose processing engine such as, for example, a microprocessor, controller, or other control logic. Processor 104 may be connected to a bus, although any communication medium can be used to facilitate interaction with other components of augmented reality activation platform 102 or to communicate externally.

Machine readable media 106 may comprise one or more interfaces, circuits, and modules for implementing the functionality discussed herein. Machine readable media 106 may carry one or more sequences of one or more instructions to processor 104 for execution. Such instructions embodied on machine readable media 106 may enable augmented reality activation platform 102 to perform features or functions of the disclosed technology as discussed herein. For example, the interfaces, circuits, and modules of machine readable media 106 may comprise, for example, 3D asset importer and management module 108, 3D pipeline and workflow management module 110, rendering engine 112, interaction engine 114, and transaction engine 116, along with one or more data stores comprising 3D scene data store 120, interactive message template data store 122, and 3D asset data store 124.

3D asset importer and management module 108 is configured to receive one or more digital 3D assets from a creator user, including one or more product 3D objects and one or more interactive message 3D objects. Each 3D asset may correspond with an image and one or more parameters. For example, the interactive message parameters may include a creator user identifier, uniform resource locator (URL) or other identifier link to a product, duration, expiration, image file, objects used, or links to external sources including third party 3D asset data store 132.

In some examples, the interactive message parameters can be defined within the campaign portal (illustrated in FIG. 6) and used to generate an interactive message 3D object. The 3D object may comprise one or more images, campaign details, parameters, or other information associated with the campaign. The image or text data may be stored with the 3D assets (e.g., as an image object) with interactive message parameters (e.g., duration/expiration, image/objects used, links to external sources). The creator may select one or more of the pre-stored message templates from interactive message template data store 122 to be used with the product and then customize various parameters of the template. For example, if the interactive message is an offer associated with the product, 3D asset importer and management module 108 may enable the creator to set expiration, delivery, and segmentation-based parameters on each message.

3D asset importer and management module 108 is also configured to upload, revise, delete, or otherwise manage 3D assets that are used to create digital objects. The 3D asset may correspond with a physical product to acquire by a consumer by displaying a 3D image of the product. In some examples, the 3D asset may be linked with one or more interactive message 3D objects to display the interactive message or other data.

3D asset importer and management module 108 is also configured to receive (e.g., via upload) product display assets (e.g., 2D images, 3D images, animations, or other product display assets) associated with a product displayed on the retailer's website. 3D asset importer and management module 108 (with rendering engine 112) may generate a product 3D asset associated with an product from the retailer user and/or an interactive message 3D object associated with a message to display with the product. Both 3D objects may be stored for later use in 3D asset data store 124. Various metadata may be associated with the product as well (e.g., product description, price, identifier, etc.). When a user accesses a webpage or other network document that includes the 3D assets, the product 3D object and the interactive message 3D object may be provided as a set of pre-packaged 3D objects that include the offer and product that are viewable in 3D at the retailer's website by the consumer. When one of the set of 3D marketing offers is selected, the corresponding offer data is applied to the purchase transaction of the product (via transaction engine 116).

During generation of the 3D assets, the product 3D object and the interactive message 3D object may be linked or otherwise associated together and the correlation between these 3D objects may be stored with 3D asset data store 124. Either of the 3D assets may be reusable to create multiple sets of 3D objects that can be provided together or separate at different retailer websites. Additional detail about the object generation and rendering process is provided with FIG. 3.

3D pipeline and workflow management module 110 is configured to define parameters for purchase, shipping, return, and other workflows related to the product. For example, the creator user may provide a uniform resource locator (URL) or other identifier link to a product. When the 3D object is selected, the user device 130 may be directed to the location (e.g., the webpage may be loaded at a browser application installed with the user device 130).

3D pipeline and workflow management module 110 is also configured to provide step-by-step instructions through the workflow process to set up the interactive messaging campaigns using the generated 3D objects. Once the campaigns are defined, these may be appended to the product 3D object asset file, using an integration processor, and merged with the 3D object back into a final format, including GL Transmission Format (GLTF) or Universal Scene Description (USDz) file format, prior to processing.

3D pipeline and workflow management module 110 is also configured to transmit a notification to a creator user. For example, once the 3D objects are converted to a final format, the notification may be generated and sent to the creator user (via Short Message Service (SMS), email, text, etc.) to download the file packages for uploading and distribution on their own Product Detail Page (PDP). In some examples, the platform may provide a preview display of the interactive message 3D object and the product 3D object prior to providing the final format.

3D pipeline and workflow management module 110 is also configured to enable the interactive message(s) for a product to be associated with the 3D assets. For example, the product 3D object, interactive message 3D objects, and the interactive message parameters may be stored in an integrated data structure, including a 3D asset data store 124. AR activation platform 102 may provide access to 3D asset data store 124 (or other integrated data structure) for use by the creator. This may allow the retailer to link a product page from the retailer website to the integrated data structure. In this way, the integrated file includes the 3D product image with 3D message parameters that are rendered with the 3D product image according to the creator's chosen options as a 3D object.

Rendering engine 112 is configured to generate 3D objects from product images or templates. For example, the product image may correspond with a product offered by a retailer to consumers. The product image may be rendered as a digital 3D model to mimic the surface of the product and make a 2D image on a user interface appear as though it was a 3D object. The rendering may add lighting effects to simulate light sources on the product (e.g., light refraction, motion blur, or other 3D effects) and/or texturing (e.g., variations in light and color).

Rendering engine is also configured to anchor an interactive message 3D object to a product 3D object. For example, 3D objects can be combined and include an anchor point. The anchor point can be determined by rendering engine 112 to create spatial relationships between all the items for the final file. The spatial relationships may be based on mathematical calculations accounting for size, relationship, and positioning in 3D that can be used to create one or more anchor points between objects. Additional detail about the anchoring process is provided with FIG. 3-4.

Anchor points may also be generated to relate objects in one or more scenes across the various combinations of the 3D axis. Rendering engine 112 may select one or more anchor points between objects to control the visibility of the multiple objects in the scene. In some examples, rendering engine 112 may generate one or more embedded markers to indicate mount points of the 3D objects in the scene. The embedded markers may be used to anchor objects to one another for manual or automated processing and combination of objects.

Interaction engine 114 is configured to facilitate interactions between the system and the receiving user. For example, once the preview is provided and the final files are created, the originator can link the files to the manufacturer's website or other shared location that can provide the file with rendered and anchored 3D objects. The file may be stored with 3D asset data store 124. The file may be stored in other locations outside of the augmented reality activation platform 102 as well.

In some examples, interaction engine 114 is configured to provide the user with parameter controls to define segmentation, personalization, and effective dates of offers. For example, the effective dates of the 3D message (e.g., a promotion, offer, notification, etc.) can be managed in order to support access controls for the files. For example, if the offer is to be valid from noon on January 15th to noon on January 30th, the creator can set those dates with the 3D object stored with 3D asset data store 124. The start date may trigger activation of the 3D object message and the end date may trigger deactivation or deletion of the 3D object message, so that the 3D object message would only be provided to end users during that timeframe.

Interaction engine 114 is configured to manage interactions post creation of the 3D objects and file. For example, the interactions may include updating and editing the created files (e.g., to change the offer or create a new variant of an offer). Further interactions can include initiating a tracking process that includes data tracking and monitoring of interactions with the 3D object and file. In some examples, the tracking process may utilize metadata stored with object during the creation of the object. The tracking process may read the metadata each time the object is used to track the use of the object and store the use in an audit log with the platform.

In some examples, the tracking process may be initiated using cookies, URL parameters, and offer codes. For example, the cookies may be stored as text files set by the websites that provides the 3D object on a user's browser to collect data about the user. the cookie may collect data such as clicks, view of the 3D object or message, or time spent on the website. The tracking process may access metadata associated with the 3D object or access other systems where the 3D object is used.

In some examples, the tracking process supports interaction monitoring and A/B testing. For example, when the tracking process is used for A/B testing, or split testing, the platform may collect data to implement a randomized experimentation process where two or more versions of the 3D object, interactive message 3D object, web page, or other page element are shown to different segments of website visitors at the same time to determine which version leaves the maximum impact and drives business metrics.

Transaction engine 116 is configured to initiate a payment transaction associated with the 3D objects or files when the product is ordered through augmented reality activation platform 102. For example, the transaction process may access an electronic account associated with a consumer and a merchant, and exchange funds from the consumer to the merchant in exchange for the product associated with the 3D object. When the 3D objects or files are provided outside of the platform, transactions may be initiated externally without diverting from the essence of the disclosure.

In some examples, an e-commerce platform may communicate with AR activation platform 102 to conduct payment transactions. Transaction engine 116 may provide the product information to the e-commerce platform, including a product description, SKU, and price, and the e-commerce platform may initiate a payment transaction between the account of the consumer to the account of the merchant for the product. AR activation platform 102 may receive information back from e-commerce platform when the transaction is complete to adjust the display at the user interface.

Transaction engine 116 is configured to generate a transaction record in order to support targeted marketing efforts to include segmentation, personalization, and retargeting. Transaction engine 116 is also configured to generate data reporting and analysis identifying transactions conducted through the system.

Figure 2:
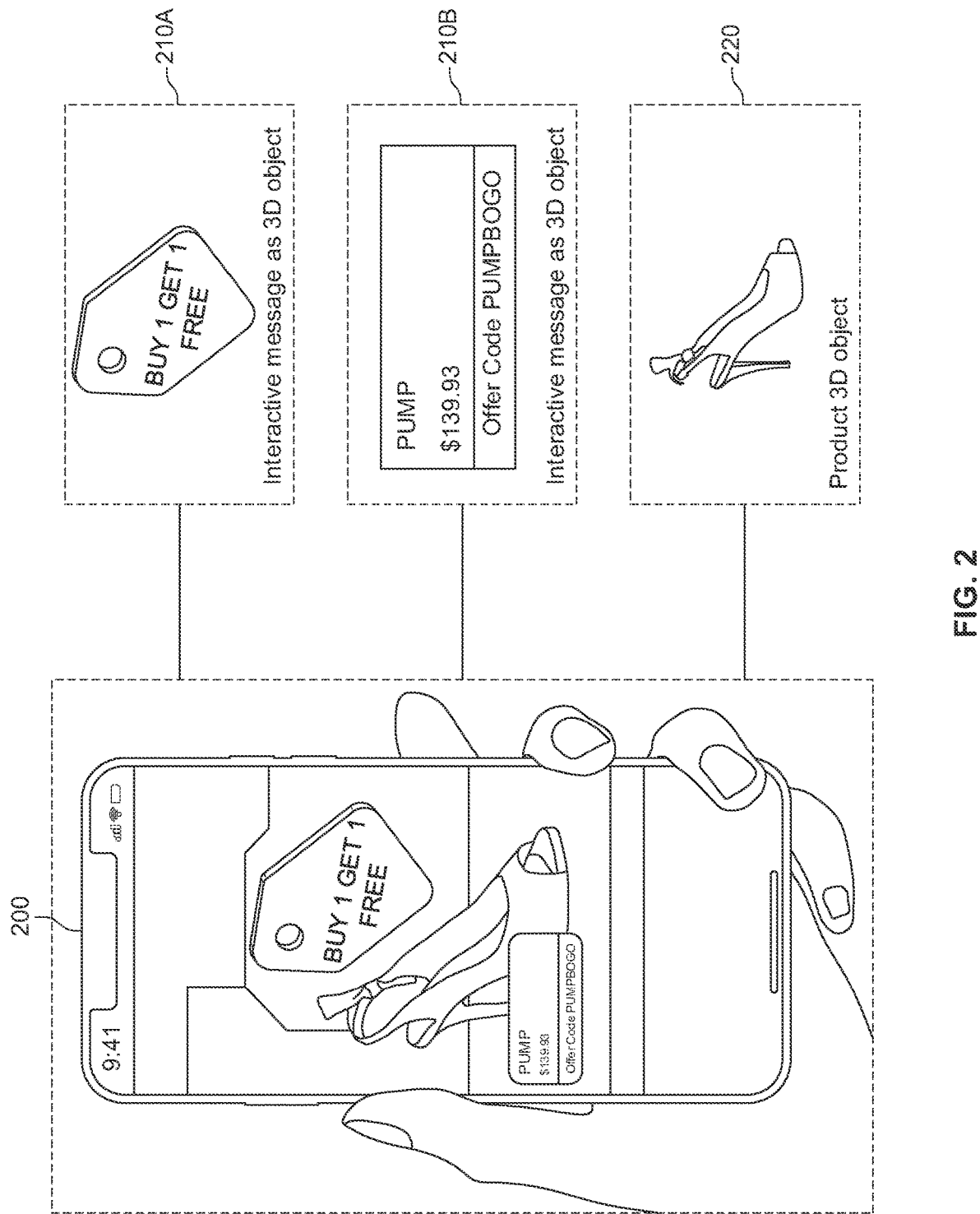
FIG. 2 illustrates a user device with a set of interactive message 3D objects and a product 3D object, in accordance with the embodiments disclosed herein.

FIG. 2 illustrates a user device with a set of interactive message 3D objects and a product 3D object, in accordance with the embodiments disclosed herein. User device 200 is illustrated in FIG. 2, which provides multiple 3D objects via a user interface, including first interactive message 3D object 210A, second interactive message 3D object 210b, and product 3D object 220.

These two types of 3D objects can be displayed at user device 200 so that customized, interactive messages associated with the product are displayed with the product, where the interactive messages are rendered (e.g., as a 3D objects 210) along with the product 3D object 220 in the same scene (e.g., as opposed to being layered on top of the 3D environment or augmented reality image). The interactive message 3D object 210 may be associated with the product 3D object 220 by being juxtaposed within the scene with the product 3D object (e.g., so that the interactive message is displayed as an independent 3D object in proximity to the product 3D object) or it may be anchored to the product 3D object 220.

Figure 3:
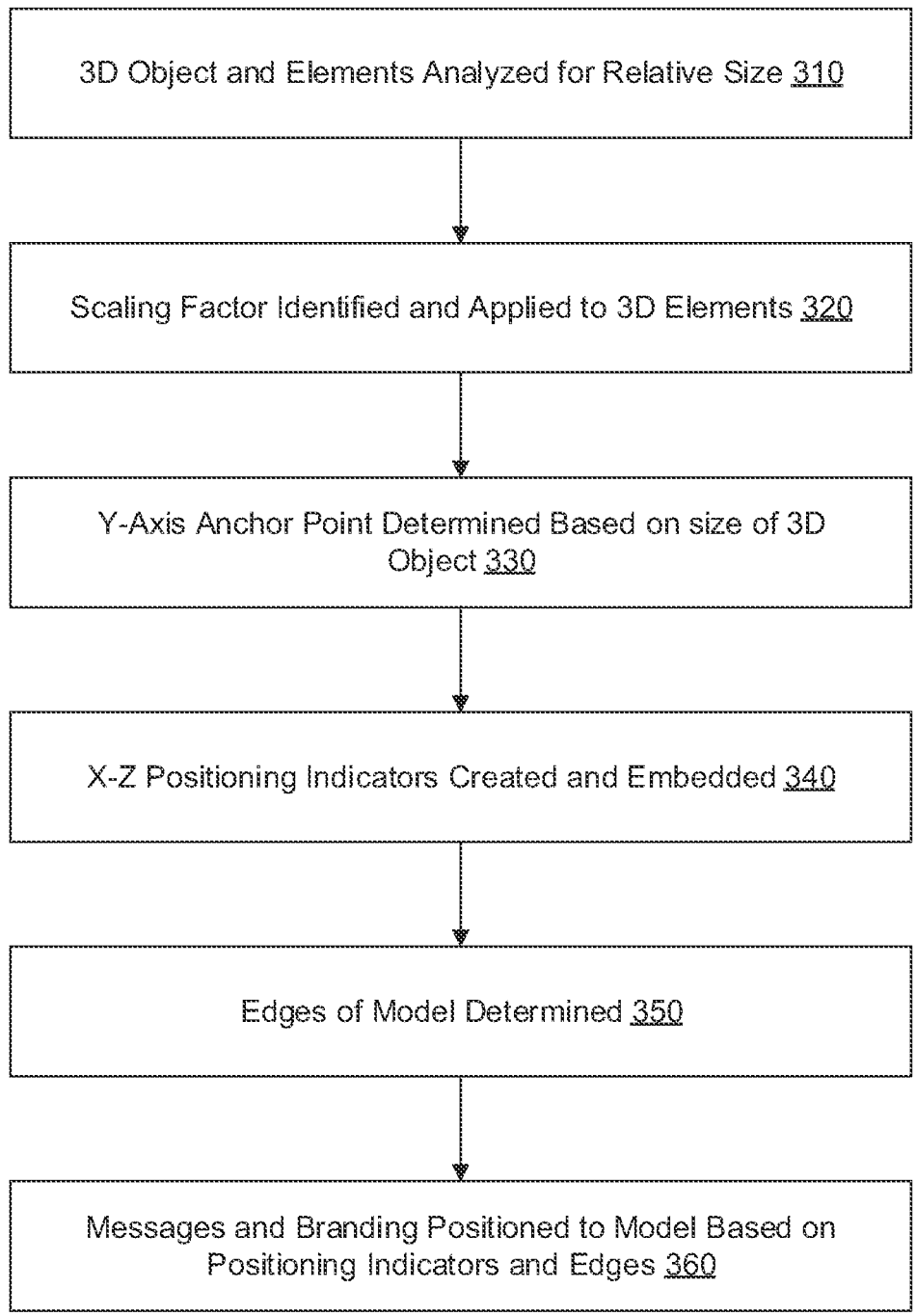
FIG. 3 illustrates a flowchart for generating, rendering, and anchoring a 3D object, in accordance with the embodiments disclosed herein.
Figure 4:
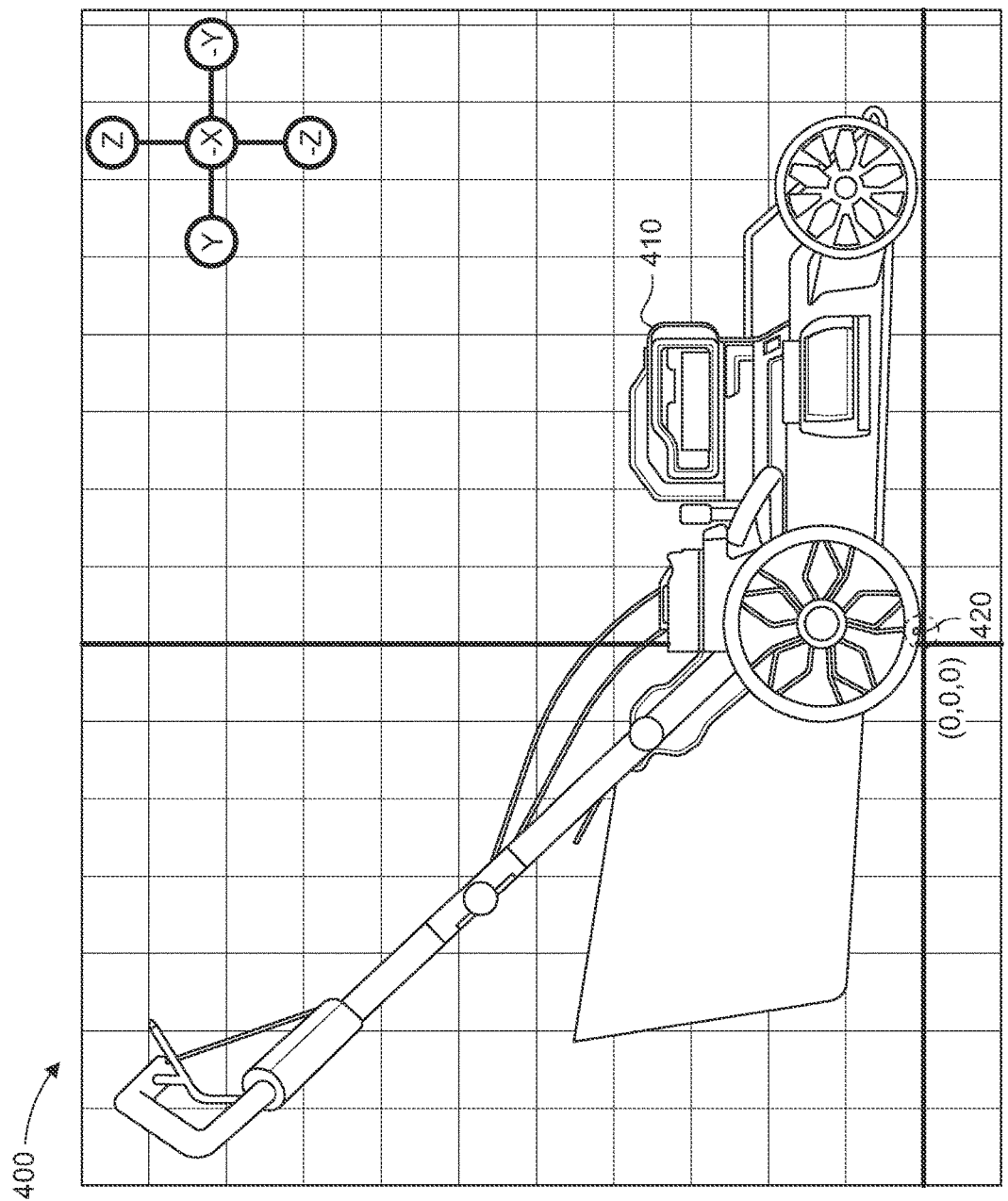
FIG. 4 illustrates an example of placing a product image on a display with a pivot point, in accordance with the embodiments disclosed herein.

FIG. 3 illustrates a flowchart for generating, rendering, and anchoring a 3D object, in accordance with the embodiments disclosed herein. For example, given a 3D object of a product, an interactive message 3D object, and optional 3D object of a brand element, the rendering engine will compose a single, 3D scene comprising all three objects optimally scaled and positioned appropriately for readability, fit with the user device's field of view, and aesthetics (or other settings). In this illustration, augmented reality activation platform 102 illustrated in FIG. 1 may perform these and other functions using the engines and modules described herein.

At block 310, 3D objects are analyzed for relative size. For example, product images may be placed in 3D-enabled display and positioned on a grid. The actual size may be identified for the product (e.g., via input by the user manually or imported as a data set for one or more models at a time). As more products are modeled on the grid, the relative sizes between the products can be determined and stored by the system by comparing the product dimensions between the product images.

Each of the product images may be placed at the display in association with a pivot point, which identifies the mathematical center of the product for rotation and scaling. An illustrative example of placing a product image on a display with a pivot point is provided in FIG. 4. In illustration 400, product image 410 is provided on a display of a user device in relation to a grid with pivot point 420. Pivot point 420 may be set to the product's bottom surface and aligned with the grid at origin (0,0,0). The front of the model may be facing the "-Y" axis, although other orientations may be implemented without diverting from the disclosure.

Using pivot point 420, the mathematical center of the product image may be defined for the 3D object. When the 3D object is interacted with at the user interface, the interactions from the user may be received by the system and limited to movements of the 3D object around the pivot point. The pivot point and the visual representation of the grid may not be displayed with the 3D object, and may define the movement limitations for the rendered object (e.g., to limit the rotation of the 3D object to pivot around pivot point 420).

In some examples, pivot point 420 may also provide a reference to identify a mathematical center of the product for scaling. For example, when the 3D object is interacted with at the user interface, the interactions from the user may be received by the system and the scaling/size of the 3D object may expand or contract around pivot point 420. In other words, the product image may remain static at the portion of the product image that exists at the pixel corresponding with pivot point 420, and the scaling of other portions of the product image may expand or contract around pivot point 420.

At block 320, a scaling factor is identified and applied to the 3D objects. For example, the rendering engine can scale the interactive message object, 3D object, and the optional 3D object of a brand element as being proportional to each other. Various proportional scales may be identified at the display, with a default 3D object scale set to 100%.

The interactive message 3D object and 3D object of the brand element may be correlated with each other based on a scale. For example, the 3D objects may be appropriately sized for a known reference object. The platform may determine an appropriate size, for example, using a reference table stored with the platform. As an illustrative example, for a larger product (i.e. refrigerator), the size of the interactive message may be 10% the size of the product. For smaller objects (i.e. coffee maker), the size of the interactive message may be 40% the size of the base product. The platform may access the reference table that stores benchmark or average sizes for the actual products. The platform may determine the ratio that serve for calculations in automations or as starting values for models where parameters are manually adjusted.

Using the scale and the size of the 3D product, the rendering engine can increase or decrease the size of the interactive message 3D object and 3D object of the brand element. In some examples, the percentage increase or decrease may be based on the ratio of the sizes of the 3D product model to the reference object (e.g., each increase by 50%).

In some examples, the ratio that the interactive message 3D object and 3D object of the brand element is increased and decreased may be bound by ranges. For example, when that ratio is close to 1, no resizing may be done. For values less than 0.75 and greater than 0.50, there may be a predetermined scaling factor applied. For a ratio value of 2 to 3, there may be another predetermined scaling factor. For ratios greater than a ratio threshold value, there may be a predetermined maximum scaling factor applied. The ratio threshold may be stored with the reference table or may be dynamic, based on implementation details provided with the platform.

The scaling factor may be based on a reference table stored with the platform. For example, the reference table may store an actual size of an object, minimum scaling factor, standard scaling factor, and maximum scaling factor based on the largest value of the X-axis, Y-axis, or Z-axis.

In some examples, the rendering engine may automatically position the interactive message 3D object and 3D object of the brand element in the 3D space. In this example, a positioning indicator and anchor point may be determined to place the 3D objects in the space, as shown with blocks 330 and 340.

At block 330, a Y-axis anchor point is determined based on the size of the 3D object. For example, the interactive message 3D object and 3D object of the brand element may be positioned approximately midway along the Y-axis of the 3D product model.

The calculations may be based on a product threshold value in association with the reference table. For example, the Y-axis would be no more than three-feet from the front of the object, so for objects larger than six-feet on the y-axis, the anchor point may be set at three-feet. If the depth of the product is greater than a product threshold value, the rendering engine may select a Y-axis anchor point closer along the Y-axis to the front of the 3D product model. In some examples, the product threshold value may not be used. Instead, logic similar to that described for X-Z positioning (block 340) may be applied through input parameters, context rules, or other indicators.

At block 340, X-Z positioning indicators are created and embedded. For example, the interactive message 3D objects and 3D object of the brand element may have associated positioning indicators to guide the position of these elements with respect to the X-axis and Z-axis. These indicators may be added manually and may be embedded in the 3D model file's metadata or in a database where they are associated with a database relationship (e.g., 3D asset data store 124 of FIG. 1). Some indicators may include "top", "top right", "top left", "right top", and "left top". Indicators may be used by the rendering engine as a starting point for calculating the position of the interactive message 3D object and 3D object of the brand element that are relative to the 3D product model.

At block 350, the edges of the model are determined. As an illustrative example, the rendering engine may determine the edges of the 3D product and also determine the edges of the interactive message 3D object and 3D object of the brand element. Each of the edges may comprise perpendicular edges of the image (e.g., left, right, top, bottom) or subsets of the perpendicular edges (e.g., top left, top right, bottom left, bottom right, left top, left bottom, right top, right bottom).

Default values may be determined. For example, as a default value, the rendering engine may determine the left, right, and top edge of the 3D product model. The left edge is the smallest value on the X axis occupied by the product model. The right edge is the largest value on the X axis occupied by the product model. The top edge is the highest value on the Z axis occupied by the product model.

The rendering engine may position interactive message 3D object and 3D object of the brand element using the position indicator identified by the user or added to the metadata of the image, including "top," "top right," "top left," "right top," and "left top."

For the "Top" indicator, the element is centered at 0 on the X axis and above the 3D product model such that there is a predetermined amount of space between the top edge of the 3D product model and the bottom edge of the element being positioned. The predetermined amount of space, for example, may be set to 10% the height of the message element or another value.

For the "Top Right" indicator, the element is centered on the right edge of the 3D product model and above the 3D product model such that there is a predetermined amount of space between the top edge of the 3D product model and the bottom edge of the element being positioned.

For the "Top Left" indicator, the element is centered on the left edge of the 3D product model and above the 3D product model such that there is a predetermined amount of space between the top edge of the 3D product model and the bottom edge of the element being positioned.

For the "Right Top" indicator, the element is positioned to the right of the right edge of the 3D product model such that there is a predetermined amount of space between the right edge of the 3D product model and the left edge of the element being positioned. The top edge of the element is set to the top edge of the 3D product model.

For "small" 3D product models (e.g., products with an actual size less than a size threshold, such as a shoe), the horizontal center of the element being positioned may be at the top edge of the 3D product model. If the product is not "small" in relation to the size threshold (e.g., larger than a shoe), the 3D product model may be placed in accordance with the predetermined amount of space between the top edge of the 3D product model and the bottom edge of the element being positioned. The predetermined amount of space, for example, may be set to 10% the height of the message element.

For the "Left Top" indicator, the element is positioned to the left of the left edge of the 3D product model such that there is a predetermined amount of space between the left edge of the 3D product model and the right edge of the element being positioned. The top edge of the element is set to the top edge of the 3D product model.

In some examples, if the interactive message 3D object and the 3D object of the brand element both have the same value for their respective position indicator, the two elements may be stacked on the Z axis and centered on the X axis with context specific rules determining their order (i.e. branding on top or branding on bottom). Examples of context specific rules may include client branding guidelines and visual hierarchy user interface rules.

In some examples, the rendering engine may accommodate 3D product models with physical/actual heights that exceed the size threshold by substituting "right top" or "left top" for any "top" position indicator.

In some examples, the rendering engine may accommodate 3D product models with physical/actual widths that exceed the size threshold by substituting "top" for "left top" and "right top" position indicators.

At block 360, messages and branding are positioned at the display in association with the model based on positioning indicators and edges. For example, the user portal may enable selection of the relative positioning and scale of the various elements as described above based on input of parameters related to size and location along all three axes. The choices in the portal overwrite the algorithm based relationships to enable the user to have some level of control over the overall composition of the scene.

The 3D objects may be provided in various contexts, including in a 3D object campaign. An illustrative process for generating the 3D object campaign is provided with FIG. 5.

Figure 5:
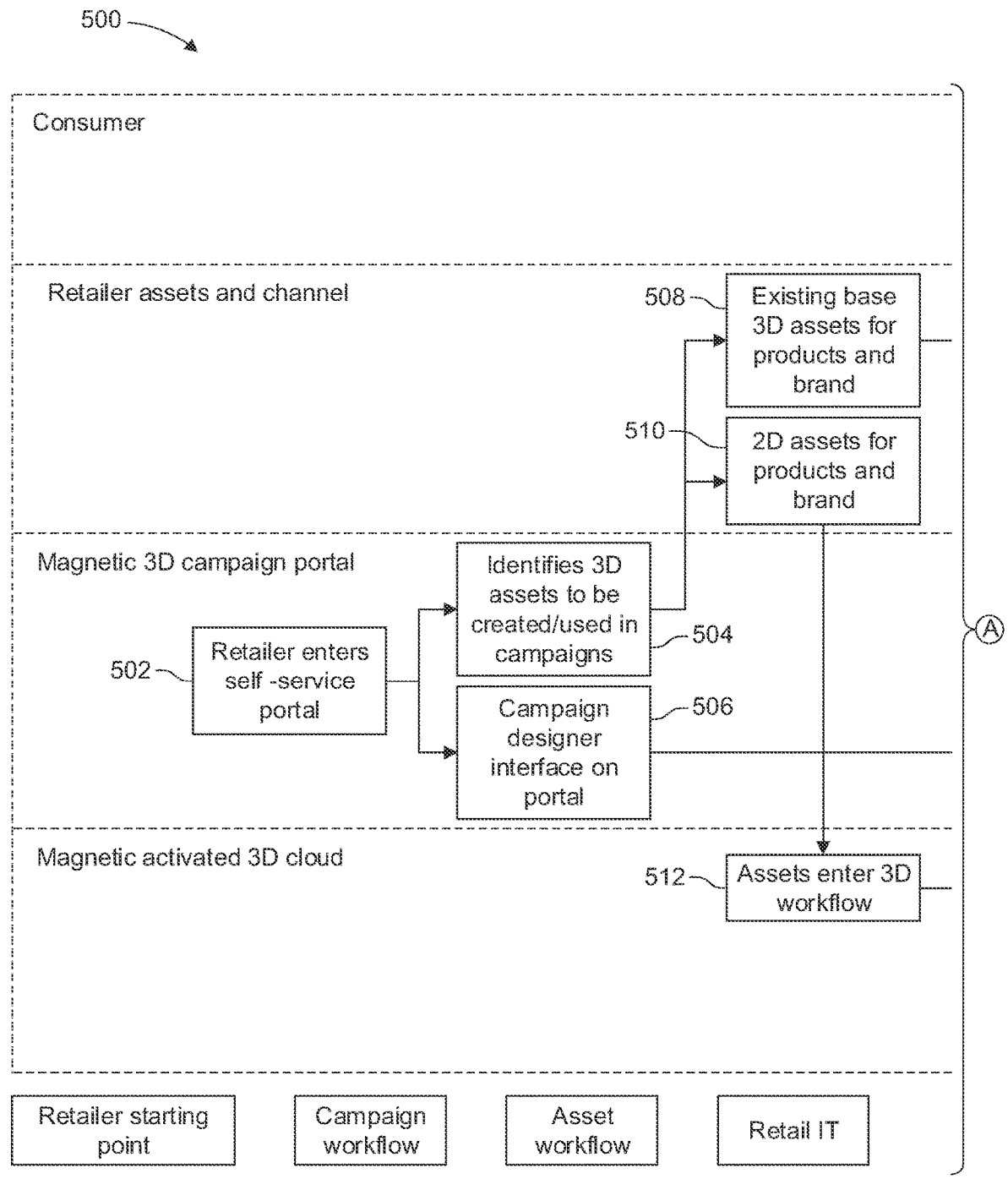
FIG. 5 illustrates a flowchart for generating and providing a 3D object campaign, in accordance with the embodiments disclosed herein.
Figure 5:
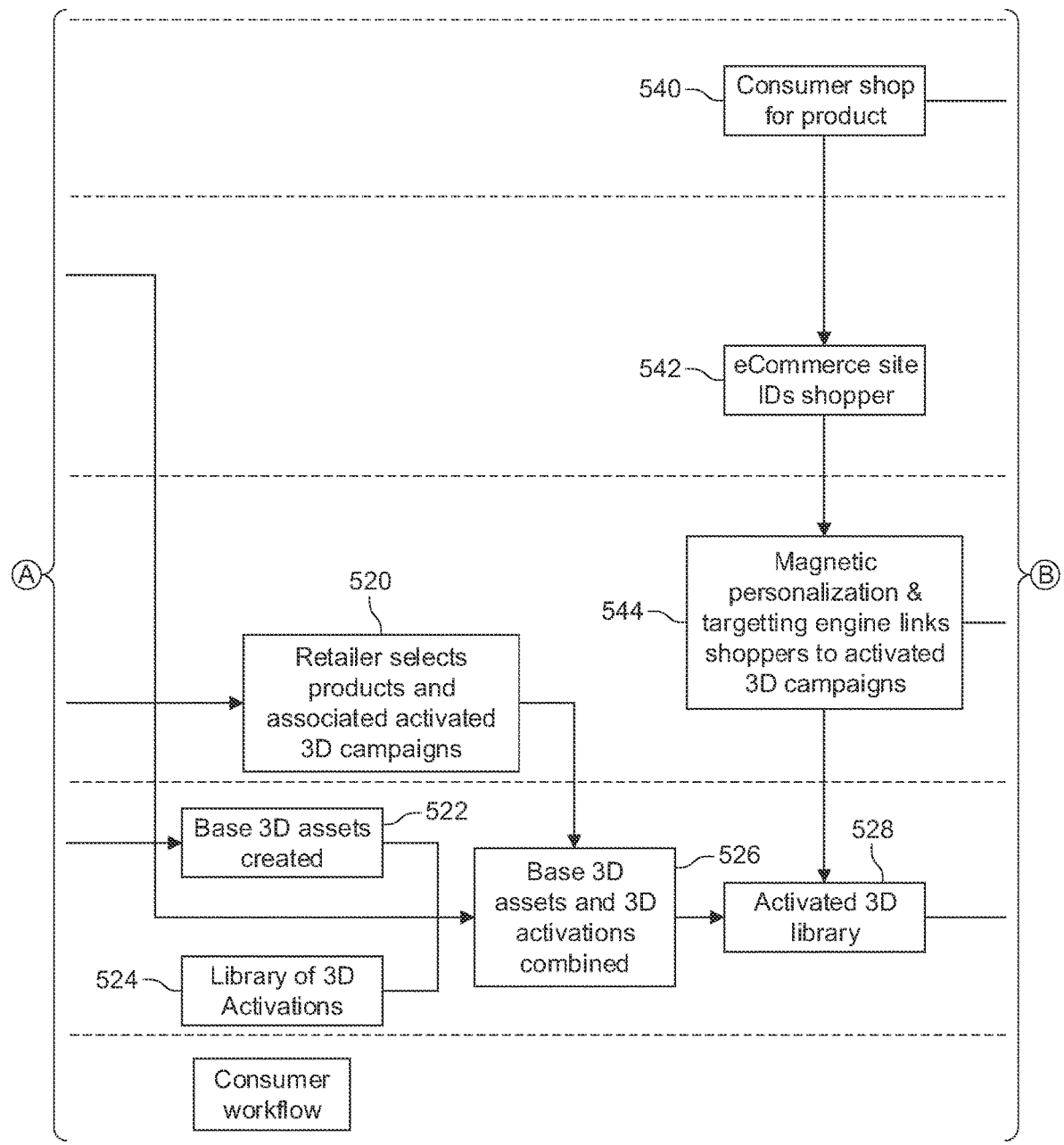
Figure 5:
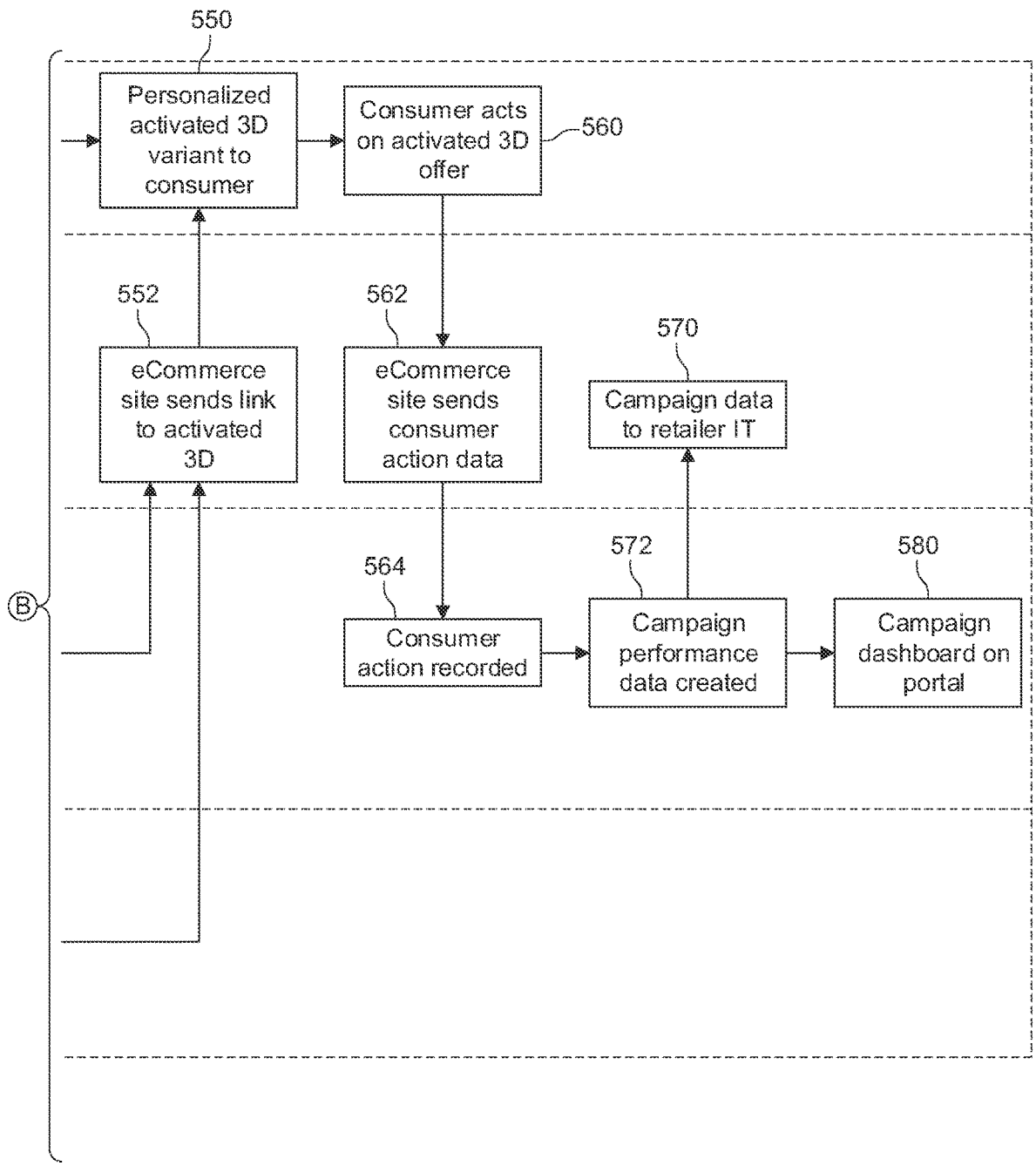

FIG. 5 illustrates a flowchart for generating and providing a 3D object campaign, in accordance with the embodiments disclosed herein. Any devices described herein may perform one or more steps illustrated herein, including augmented reality activation platform 102 illustrated in FIG. 1.

At block 502, a retailer may access the self-service portal. For example, the user may browse to the platform using a generic browser software application at their user device or a dedicated software application incorporated with the user device. The platform may accept user login credentials to authenticate an authorized user. Once authorized the user may access the platform, based on various examples and implementation details.

At block 504, the asset workflow may identify one or more 3D assets to be created or used in campaigns. The 3D assets may identify products or messages, as described throughout the disclosure. For example, the 3D assets may comprise existing base 3D assets for products and brand 508 (e.g., generated through the platform using a template or previously provided file) or 2D assets for products and brand 510. In some examples, the user may upload the 2D assets for products and brand 510 via the browser.

At block 506, the campaign designer interface may be provided to the portal. For example, the platform may provide an interface for designing a new campaign that can generate a product 3D object or an interactive message 3D object.

At block 512, one or more 3D assets may enter a 3D workflow. For example, the 3D workflow may identify the process for providing the product 3D object or the interactive message 3D object, or both, to a consumer user.

At block 520, the retailer may select products and associated activation 3D campaigns. For example, the selected products and activation of the 3D campaigns may correspond with template that are predefined. The user may provide new files to import into the templates and used to create the new 3D campaigns using the platform.

At block 522, base 3D assets may be created. For example, the base 3D asset may correspond with or the interactive message 3D object. The base 3D assets may be generated as standalone files and stored in the system prior to associating the 3D objects together.

At block 524, a library of 3D activations may be accessed. For example, the 3D activations may identify the movement of each of the 3D objects provided at the interface. In some examples, the 3D activations may identify an animated line or circle for the 3D object to follow as it is animated at the interface. Other forms of animation may be defined and stored with the library of 3D activations.

At block 526, base 3D assets and 3D activations may be combined. For example, once the 3D assets are generated, the 3D activations may be associated with the generated 3D assets. The movement defined by the system may be repeated and reused for more than one 3D asset.

At block 528, activated 3D library may be accessed. For example, the base 3D assets stored as 3D objects and the corresponding 3D activations may be stored with the 3D library or other data store. In some examples, the 3D objects may be used to generate a single file that can be transmitted to an e-commerce site or correspond with a link to the activated 3D object.

At block 540, a consumer user may shop for a product at a retailer's website. For example, the user may browse to a website that incorporates the 3D objects from the platform. The user may utilize a generic browser software application at their user device or a dedicated software application incorporated with the user device.

At block 542, the e-commerce site may identify the consumer user. For example, the website that incorporates the 3D objects from the platform may be personalized for a consumer user (e.g., using a user profile). In some examples, the platform may accept user login credentials to authenticate an authorized user or implement display preferences associated with a user profile.

At block 544, the platform may link the consumer user to activated 3D campaign. For example, the 3D objects to provide to the consumer user may link the consumer user to a product associated with the product 3D object or interactive message 3D object. In some examples, providing the 3D objects to the consumer user may also be associated with a tracking process using cookies, URL parameters, and offer codes.

At block 550, a personalized activated 3D campaign may be provided to the consumer user. For example, the consumer user may view the personalized 3D variant at the browser or dedicated software application of the user device.

At block 552, the e-commerce website may send the link to the activated 3D campaign. For example, the link may be used to show the personalized 3D campaign at block 550.

At block 560, the consumer user may interact, select, or otherwise activate the 3D offer associated with the product. In some examples, the interaction, selection, or other activation commands may be recorded during the tracking process locally at the user device or remotely from the user device at the platform.

At block 562, the e-commerce site sends the consumer action data to the platform. For example, when the user device locally records the commands, the interaction data may be transmitted to the platform.

At block 564, the consumer action is recorded (e.g., in a data store associated with the platform).

At block 570, campaign data may be provided to the retailer. In some examples, the data collected through the tracking process using cookies, URL parameters, or offer codes, may be recorded and provided to the retailer user. Each of these commands and interactions may be associated with a particular campaign and stored with a campaign identifier in the data store.

At block 572, the campaign performance data may be created. Illustrative campaign performance data is provided with FIG. 12 as a campaign dashboard.

At block 580, campaign dashboard may be updated on the user portal. For example, the user portal may be accessible using a browser application associated with the user device.

Figure 6:
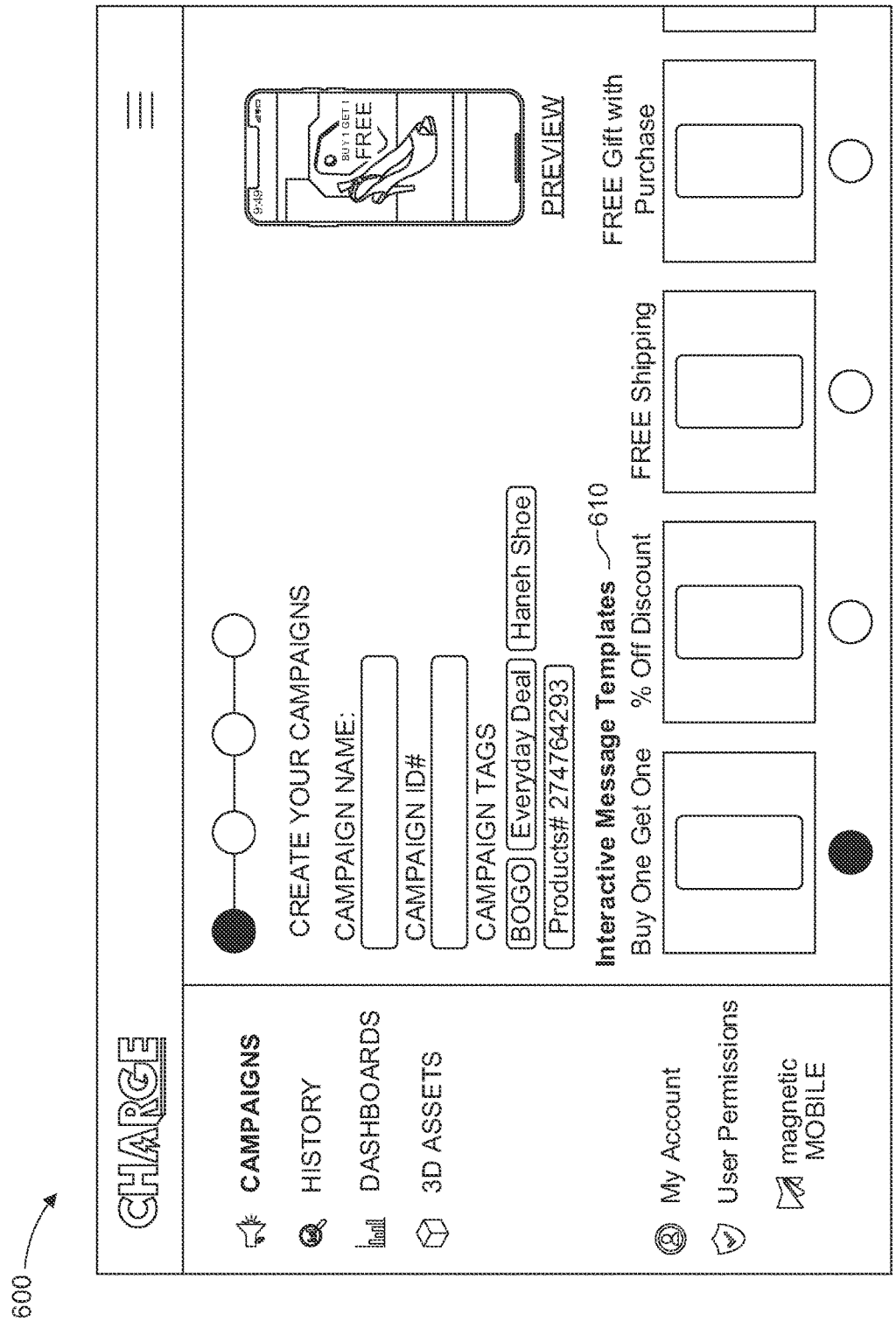
FIG. 6 illustrates a campaign portal with access to interactive message templates, in accordance with the embodiments disclosed herein.

FIG. 6 illustrates a campaign portal with access to interactive message templates, in accordance with the embodiments disclosed herein. In example 600, a campaign portal is provided. The campaign portal may be a self-managed campaign portal so that the creator user can select an interactive message template 610 and customize it (via 3D asset importer and management module 108 in FIG. 1). The interactive message templates 610 may be pre-stored.

For example, the campaign message designer component enables the creator to select one or more of the pre-stored interactive message templates 610 and/or customize a template using various parameters associated with the template. Once the template is defined for a 3D asset, the template may be populated with the parameters and used to display information (e.g., images or product descriptions) with the product. The pre-stored message template may enable the creator to select a layout or other visual features (via the message designer component) to automatically organize digital 3D objects on a webpage for the consumer.

Once the interactive message template 610 is selected and populated, the portal may provide the correlated data to a creator's website for a consumer to interact with in parallel. The portal may also enable the creator to create and manage interactive messages directly within the 3D asset that the creator may upload via the 3D asset importer and management module.

Figure 7:
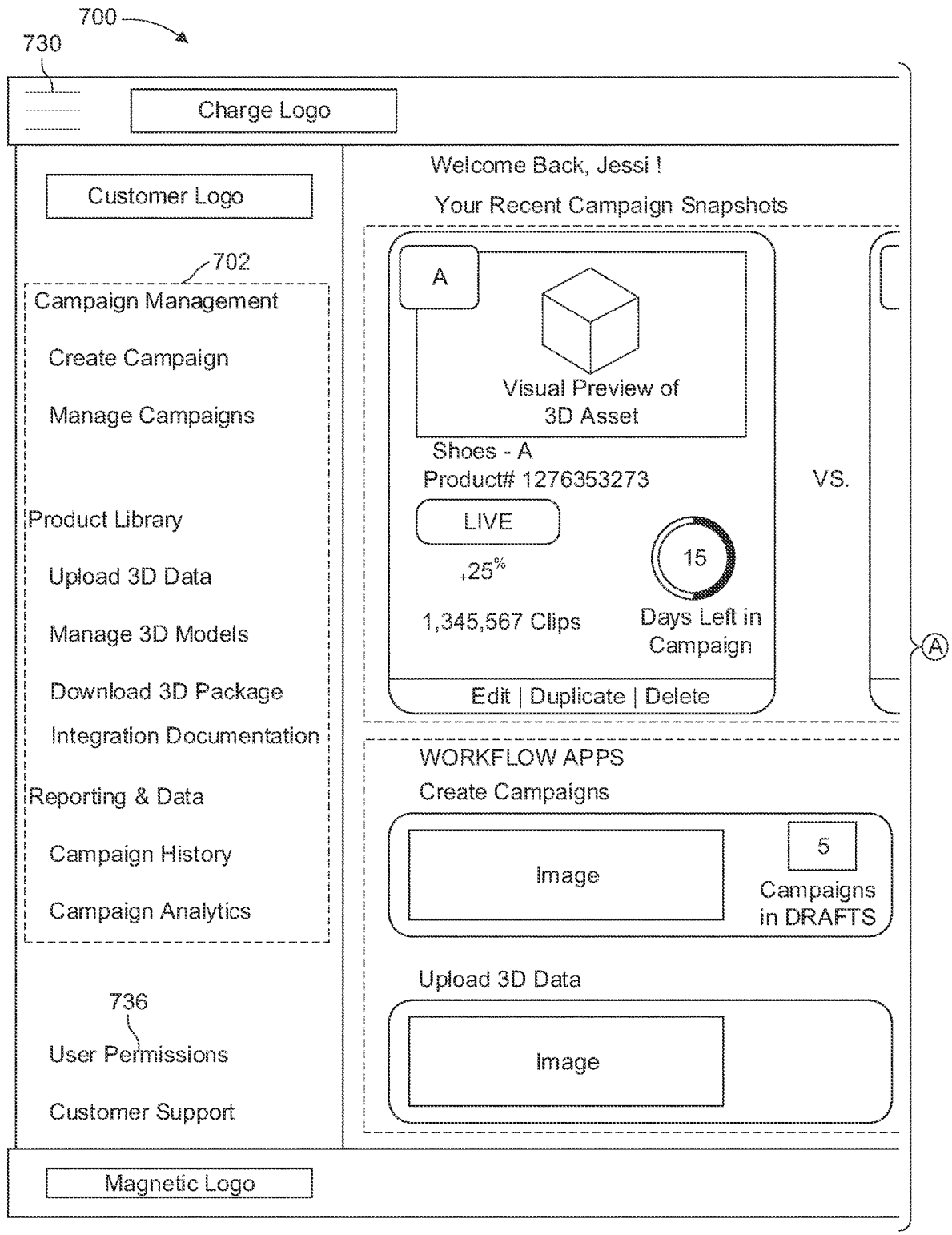
FIG. 7 illustrates a campaign portal with access to generated campaigns and workflows, in accordance with the embodiments disclosed herein.
Figure 7:
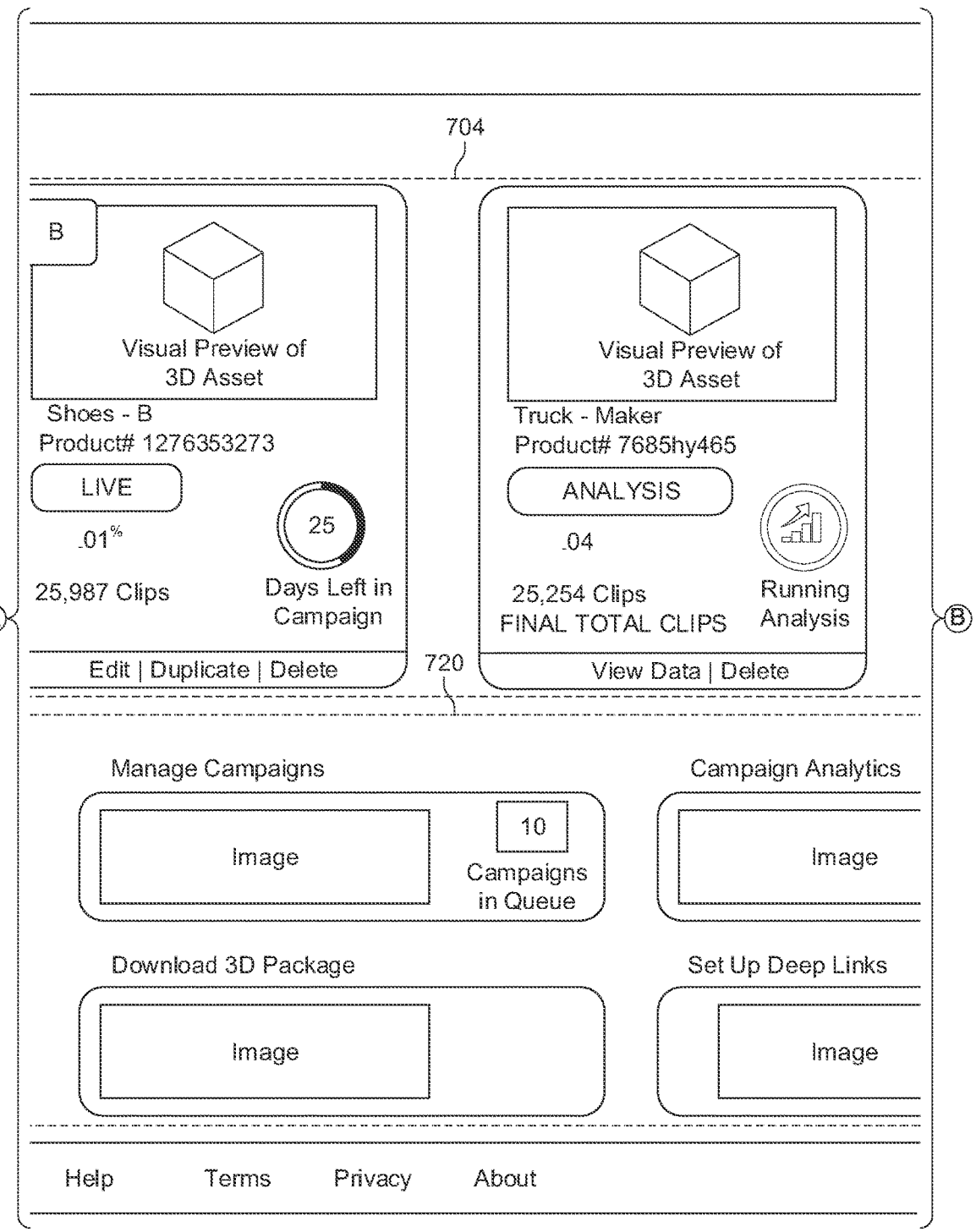
Figure 7:
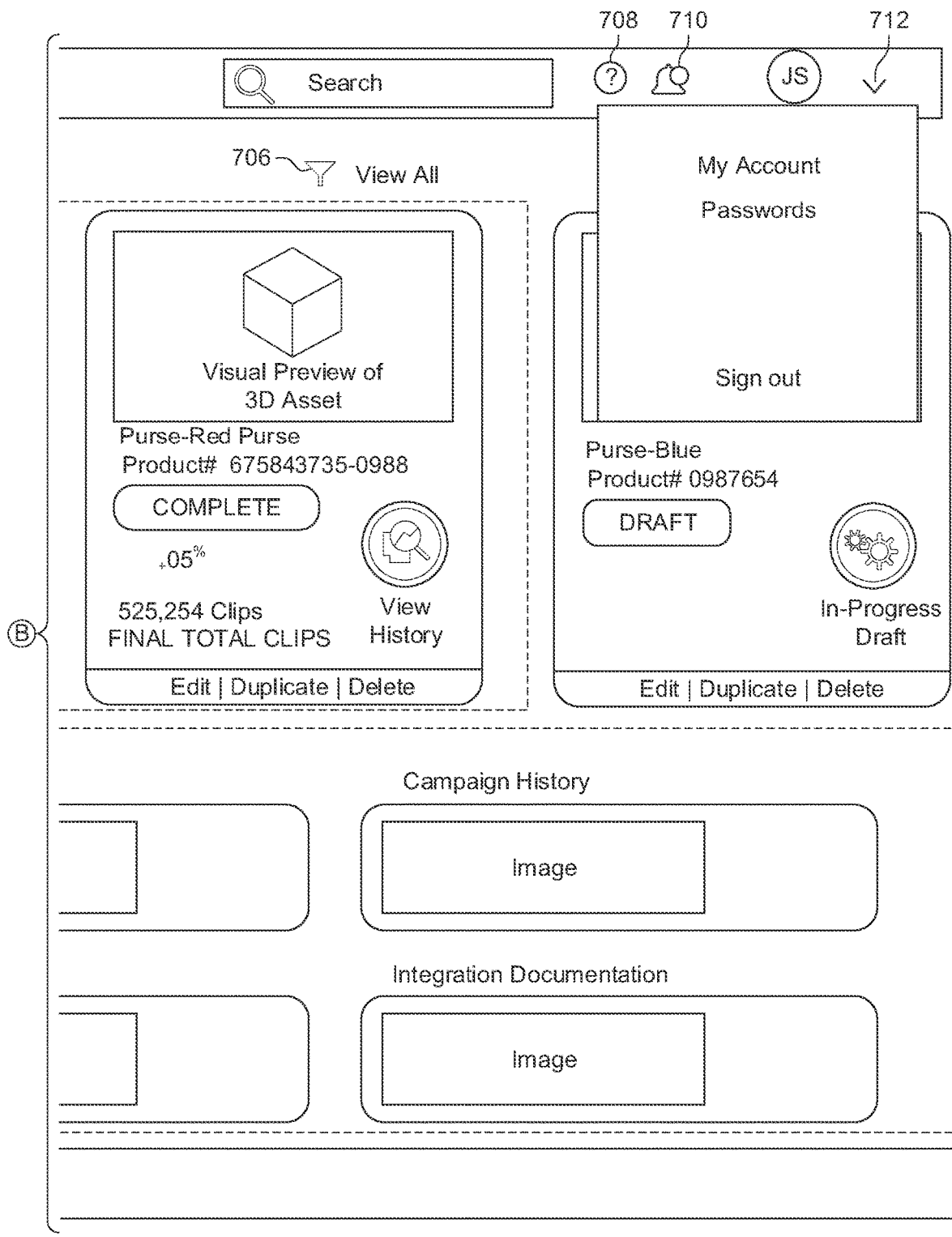

FIG. 7 illustrates a campaign portal with access to generated campaigns and workflows, in accordance with the embodiments disclosed herein. In example 700, a campaign portal is provided. The campaign portal may be a self-managed campaign portal so that the creator user can view results from an activated campaign (via 3D pipeline and workflow management module 110 in FIG. 1).

At block 702, navigation to campaigns, products, and reporting data is provided. The campaigns may be generated and managed through the platform, including using a campaign designer component and 3D pipeline and workflow management component. The campaigns may be created without a template as well. The products may be generated and managed through the platform, including uploading 3D data (e.g., products, offers, messages, or other 3D data), manage 3D models or data, download 3D packages (e.g., combined 3D objects), processes or information on integrating products with other components of the system. The products may be generated or managed using a 3D asset importer and management module, a set of pre-stored message templates, custom non-templated information or offers, or may be generated without using templates. The reporting and data may also be generated and managed through the platform, including access to campaign history and campaign analytics, as discussed herein.

At block 704, one or more campaigns may be provided. The campaigns may be sorted on a time basis (e.g., most recent campaign first) or on an effectiveness basis (e.g., highest conversion rate or click rate first). The data illustrated in the campaign portal may be collected through the tracking process locally at the user device or remotely at the platform. Data may be aggregated using various features (e.g., average, greatest value, or other calculations). The illustrative calculations may be defined in a user profile.

At block 706, a filtering or search tool is provided to allow access to the one or more campaigns. For example, the user may view all campaigns or view a subset of campaigns filtered by various metadata described throughout the application (e.g., date, time, product type, or other descriptors).

At block 708, a help icon is provided. For example, the help icon may provide a description of the campaigns or data provided from the tracking process.

At block 710, alerts or messages are provided. For example, the alerts or messages may identify time based notifications or priority based notifications associated with the 3D campaigns or authentication credentials of the platform.

At block 712, a drop-down for more information of a user's account is provided. For example, the information associated with the user's account may identify profile information, authentication credentials, or other information associated with the user.

At block 720, one or more workflow applications are provided. The workflow applications may include, creating a new campaign, managing an existing campaign, campaign analytics, campaign history, upload 3D data, download 3D data, set up links, integration documentation, or other information. In some examples, the workflow applications may be sorted or filtered based on use throughout the portal. The information associated with the one or more workflow applications may be generated by 3D pipeline and workflow management module 110 in FIG. 1.

At block 730, mobile-friendly navigation is provided. For example, when the user accesses the campaign management portal using a mobile device, the platform may switch to a mobile friendly display provided at the interface.

At block 736, user account information is provided. For example, the user account information may include user permissions (e.g., delegate users, proxy users, or other defined users that have access to the information provided platform) or access to customer support for additional help.

Figure 8:
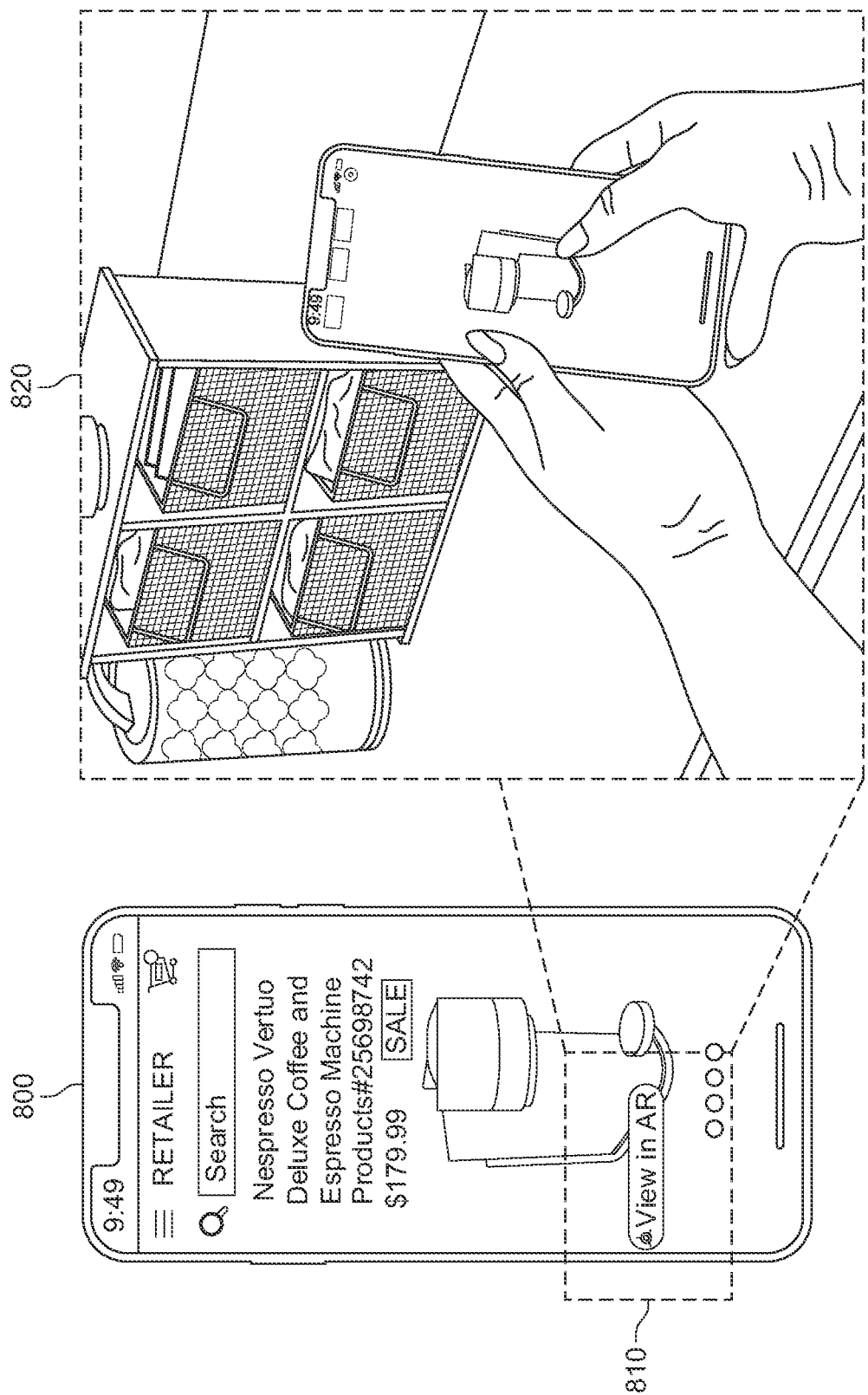
FIG. 8 illustrates a user interface with a product 3D object, in accordance with the embodiments disclosed herein.

FIG. 8 illustrates a user interface with a product 3D object, in accordance with the embodiments disclosed herein. In this illustration, user device 800 accesses a retailer website after the retailer user has generated the 3D assets through augmented reality activation platform 102 in FIG. 1. The retailer website may include a "view in AR" tool 810. When selected, the product associated with the retailer website may be provided as a 3D object 820 at the user device. The consumer user may interact with the 3D object in a digital environment.

Figure 9:
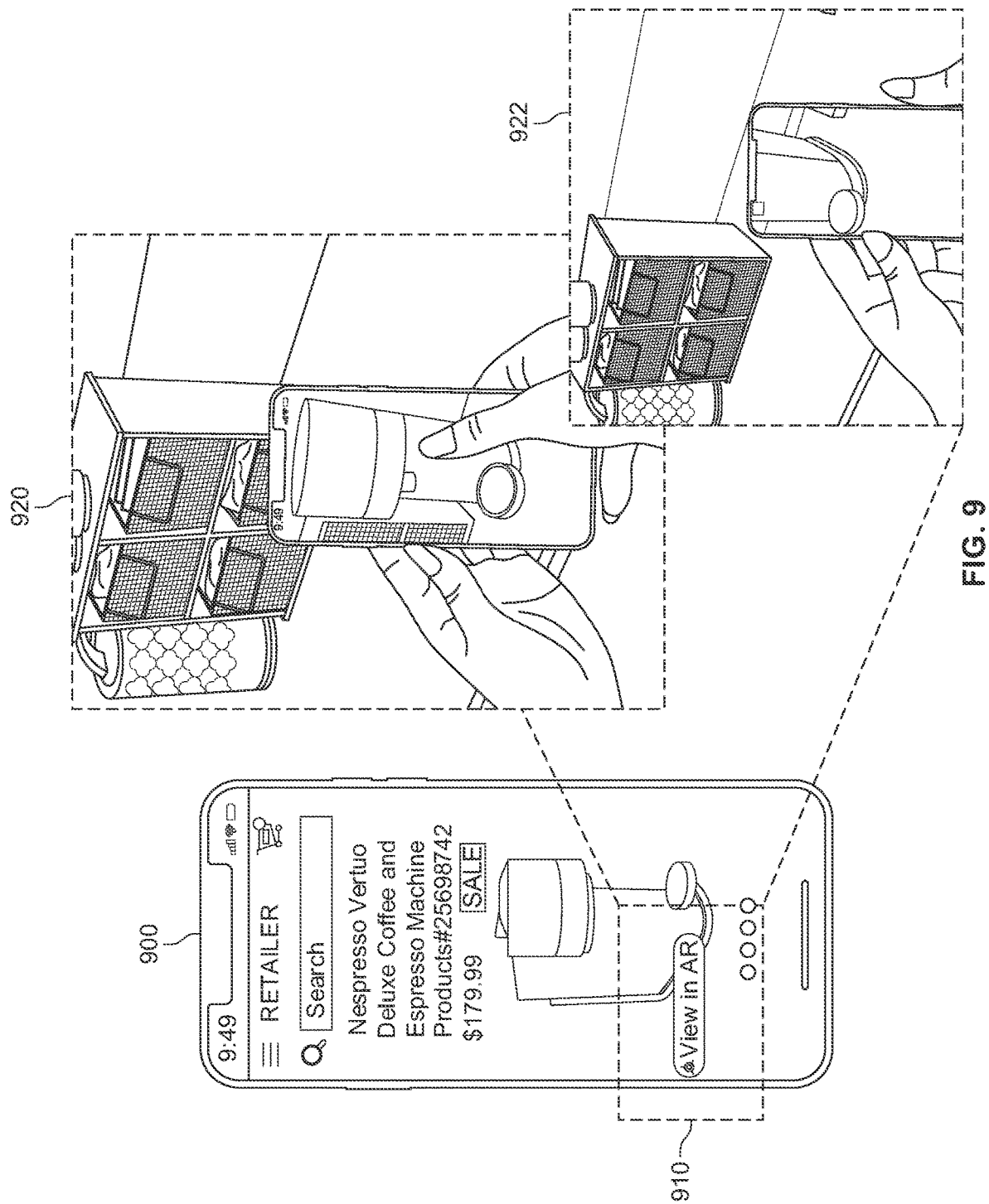
FIG. 9 illustrates a user interface with a product 3D object in an AR environment, in accordance with the embodiments disclosed herein.

FIG. 9 illustrates a user interface with a product 3D object in an AR environment, in accordance with the embodiments disclosed herein. In this illustration, user device 900 accesses a retailer website after the retailer user has generated the 3D assets through augmented reality activation platform 102 in FIG. 1. The retailer website may include a "view in AR" tool 910. When selected, the product associated with the retailer website may be provided as a 3D object at the user device in an augmented reality environment. In this example, the product 3D object may be provided in the digital environment and anchored at a location so that when the user device moves from a first location 920 to a second location 922, the product 3D object remains static.

The product 3D object may be rendered and anchored to a real-world object in the digital environment. For example, once the 3D object of the product and other 3D objects (e.g., the message or other assets) are combined into one 3D file, the features of the standard WebAR viewers may operate to control the anchoring of objects in scene.

Figure 10:
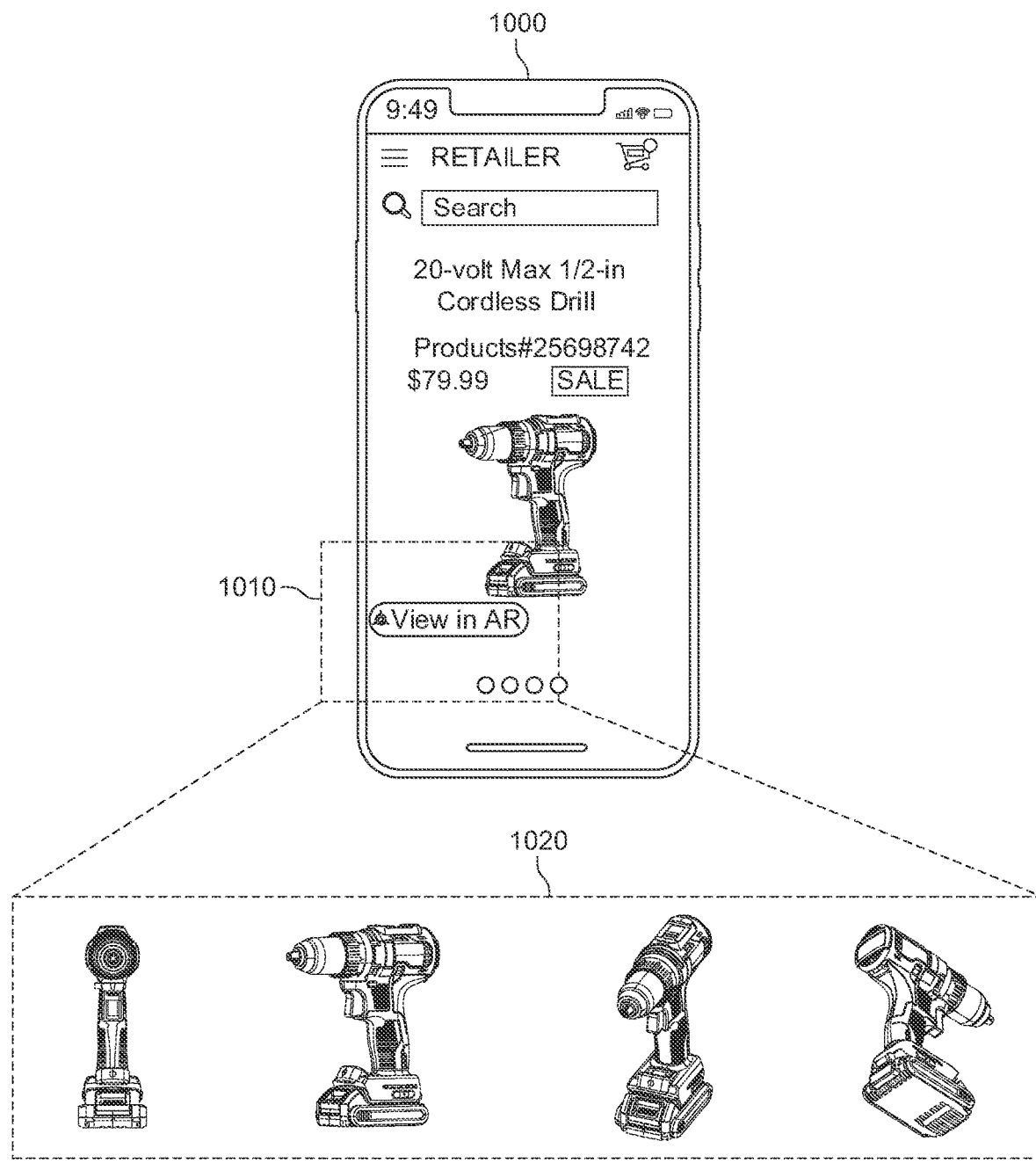
FIG. 10 illustrates a user interface with a product 3D object, in accordance with the embodiments disclosed herein.

FIG. 10 illustrates a user interface with a product 3D object, in accordance with the embodiments disclosed herein. In this illustration, user device 1000 accesses a retailer website after the retailer user has generated the 3D assets through augmented reality activation platform 102 in FIG. 1. The retailer website may include a "view in AR" tool 1010. When selected, the product associated with the retailer website may be provided as a 3D object 1020 at the user device, where the user can rotate the object 360-degrees. The consumer user may interact with the 3D object in the digital environment.

Figure 11C:
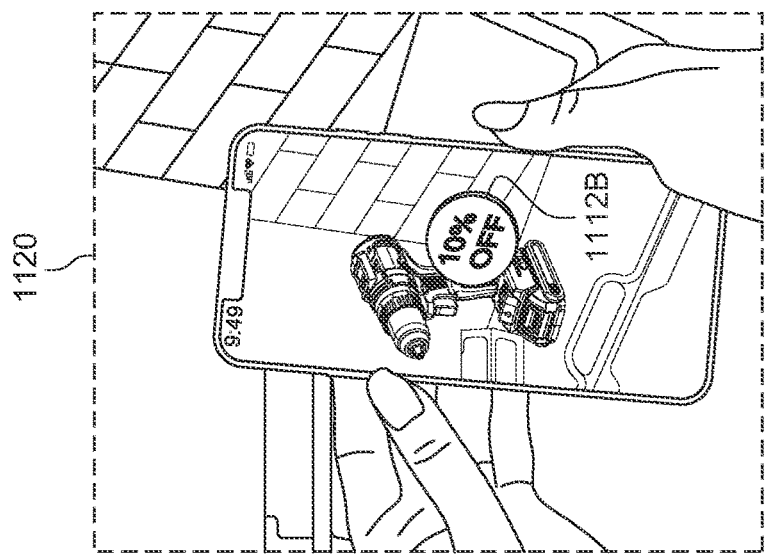
FIGS. 11A, 11B, and 11C illustrate a progression of a user interface with a product 3D object and interactive message 3D object in an AR environment, in accordance with the embodiments disclosed herein.
Figure 11B:
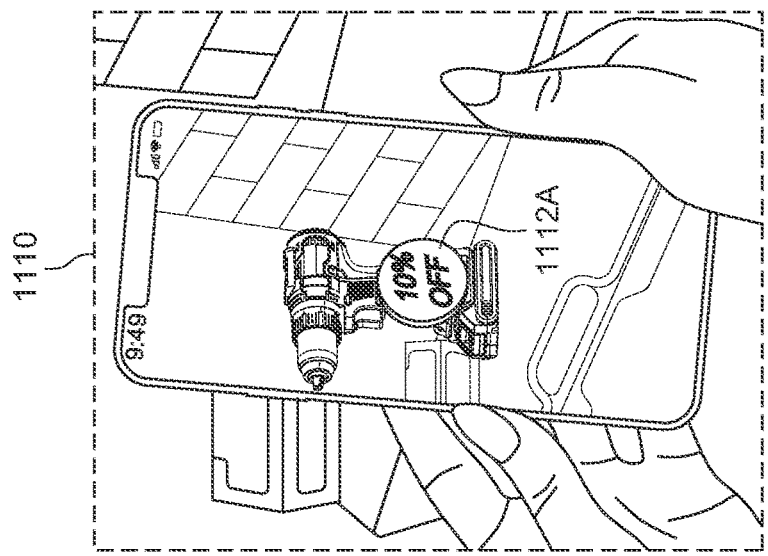
Figure 11A:
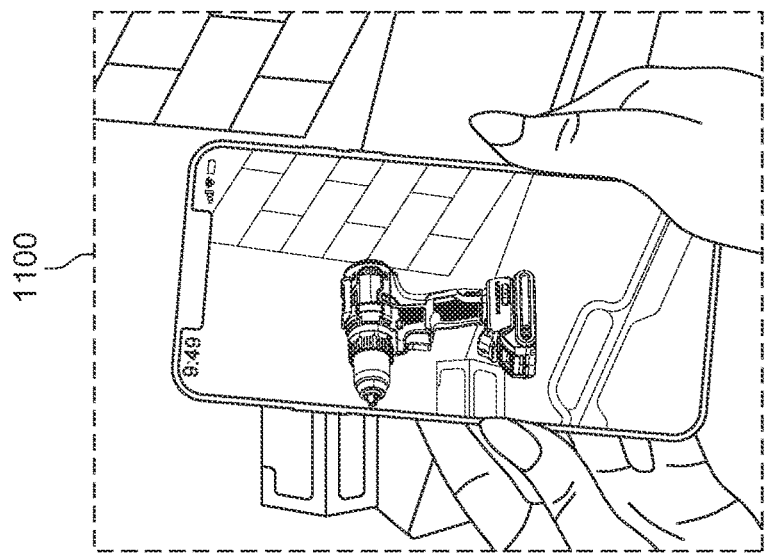

FIGS. 11A, 11B, and 11C illustrate a progression of a user interface with a product 3D object and interactive message 3D object in an AR environment, in accordance with the embodiments disclosed herein. In FIG. 11A, the user device accesses a retailer website after the retailer user has generated the 3D assets through augmented reality activation platform 102 in FIG. 1. Once the "view in AR" tool is selected, the product is displayed in AR.

The product viewed in AR is shown in FIGS. 11B and 11C. For example, the retailer website may be provided as a product 3D object 1100 with a corresponding interactive message 3D object 1110 at the user device. The interactive message 3D object may be animated in 3D, moving from a first position 1112A to a second position 1112B, while being anchored within a constant distance to the product 3D object. The consumer user may interact with the product 3D object or the interactive message 3D object in the digital environment, including selecting the 3D object 1120 to access a retailer's website associated with the 3D object.

Figure 12:
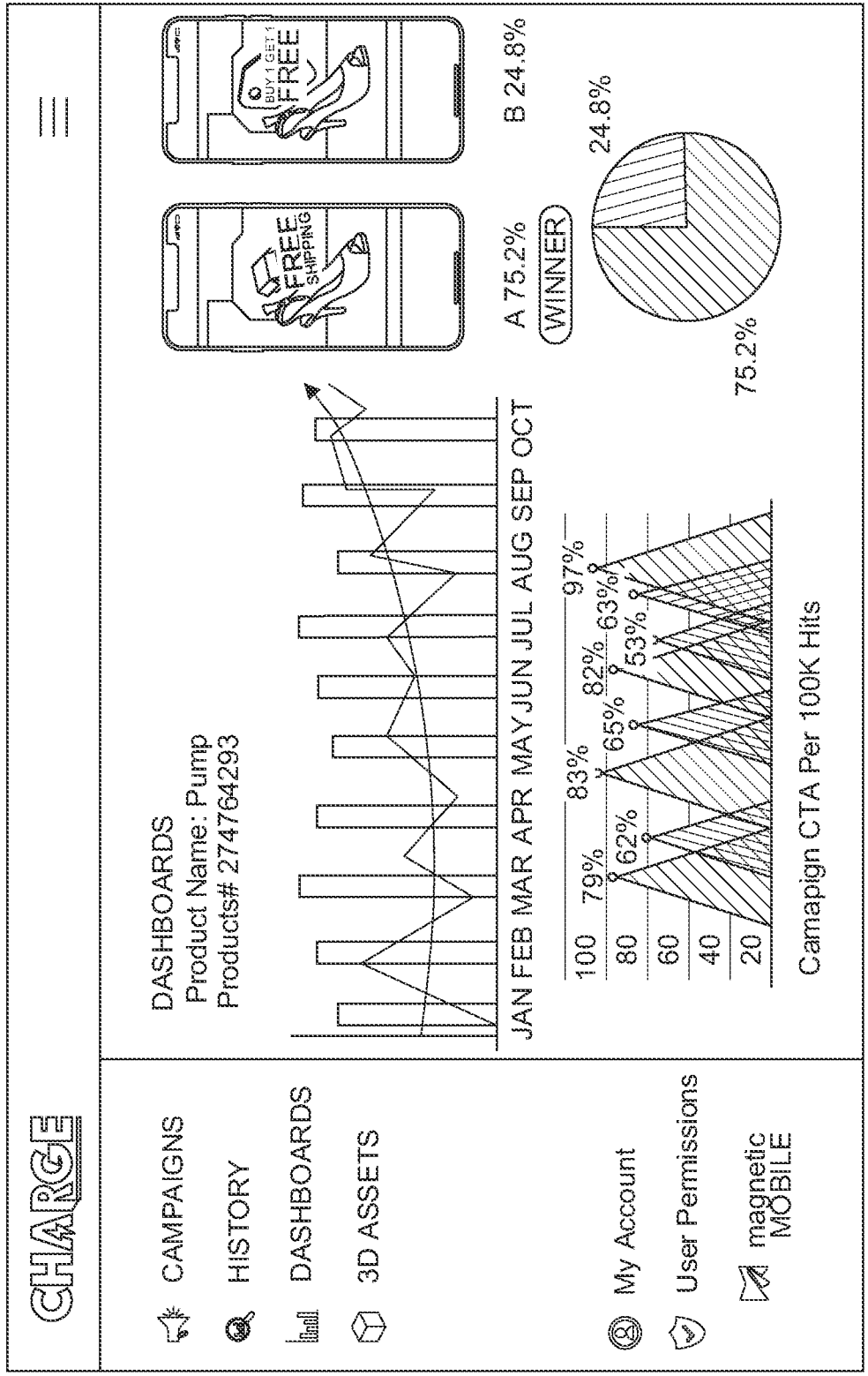
FIG. 12 illustrates a campaign portal with access to generated campaigns and workflows, in accordance with the embodiments disclosed herein.

FIG. 12 illustrates a campaign portal with access to generated campaigns and workflows, in accordance with the embodiments disclosed herein. In this example, the campaign portal can include results associated with an activated campaign (via 3D pipeline and workflow management module 110 in FIG. 1).

Figure 13:
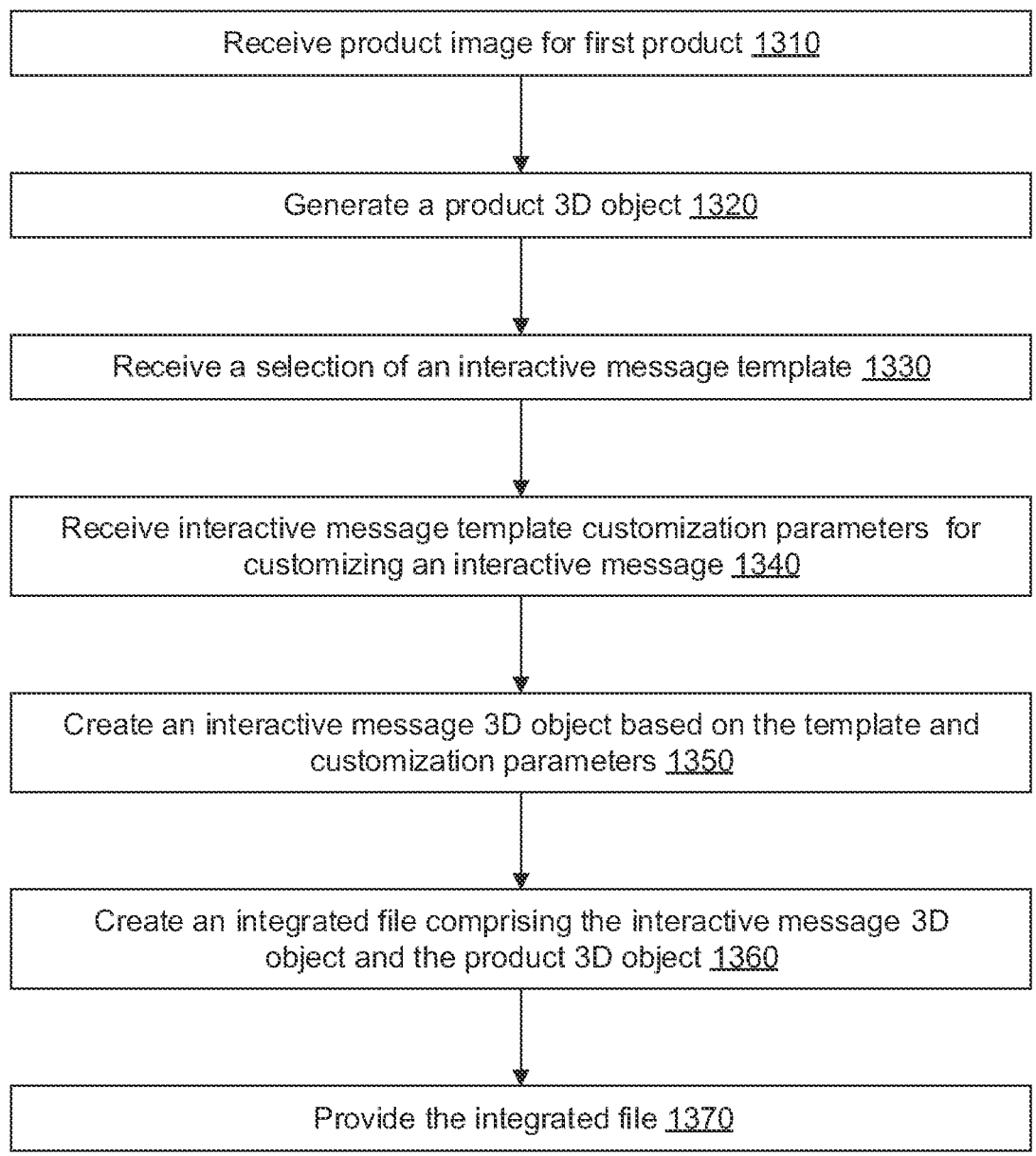
FIG. 13 illustrates a process for providing an interactive message 3D object and product 3D object in a campaign, in accordance with the embodiments disclosed herein.

FIG. 13 illustrates a process for providing an interactive message 3D object and product 3D object in a campaign, in accordance with the embodiments disclosed herein. In this illustration, augmented reality activation platform 102 in FIG. 1 may execute machine-readable instructions to perform the process described herein for composing a rendered scene comprising a product 3D object and one or more associated interactive message 3D objects rendered in the scene with the product 3D object.

At block 1310, a product image for first product may be received. For example, the one or more product images for the first product may be received via the 3D asset importer and management module 108 of FIG. 1.

At block 1320, a product 3D object may be generated. For example, the product 3D object may be generated via the 3D pipeline and workflow management module 110 of FIG. 1 based on the one or more product images for the first product.

At block 1330, a selection of an interactive message template may be received. For example, augmented reality activation platform 102 of FIG. 1 may receive a selection of at least one of the stored interactive message templates stored in interactive message template data store 122.

At block 1340, interactive message template customization parameters may be received. The interactive message template customization parameters may help a retailer or creator user customize an interactive message for the first product that can be displayed at the retailer website.

At block 1350, an interactive message 3D object may be created based on the template and customization parameters.

At block 1360, an integrated file may be created. The integrated file may comprise the interactive message 3D object for the first product and the product 3D object for the first product.

Figure 14:
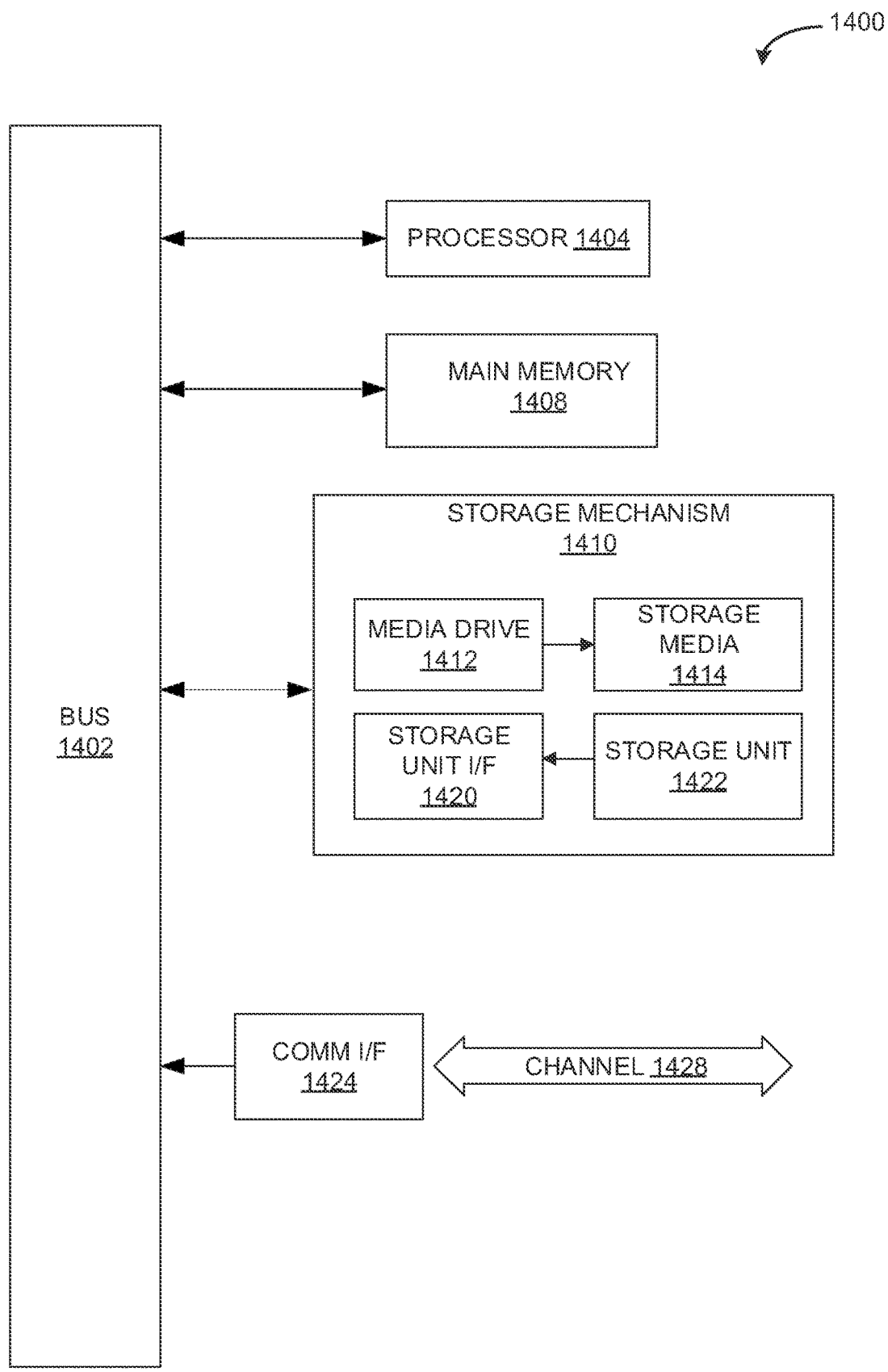
FIG. 14 is an example of a computing system that may be used in implementing various features of embodiments of the disclosed technology.

At block 1370, the integrated file may be provided. For example, augmented reality activation platform 102 of FIG. 1 may provide the integrated file for display in the rendered scene. The rendered scene may include the interactive message 3D object rendered with the product 3D object in the rendered scene.

Where components, logical circuits, or engines of the technology are implemented in whole or in part using software, in one embodiment, these software elements can be implemented to operate with a computing or logical circuit capable of carrying out the functionality described with respect thereto. One such example logical circuit is shown in FIG. 14. Various embodiments are described in terms of this example logical circuit 1400. After reading this description, it will become apparent to a person skilled in the relevant art how to implement the technology using other logical circuits or architectures.

Referring now to FIG. 14, computing system 1400 may represent, for example, computing or processing capabilities found within desktop, laptop, and notebook computers; hand-held computing devices (PDA's, smart phones, cell phones, palmtops, etc.); mainframes, supercomputers, workstations, or servers; or any other type of special-purpose or general-purpose computing devices as may be desirable or appropriate for a given application or environment. Logical circuit 1400 might also represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 1400 might include, for example, one or more processors, controllers, control engines, or other processing devices, such as a processor 1404. Processor 1404 might be implemented using a general-purpose or special-purpose processing engine such as, for example, a microprocessor, controller, or other control logic. In the illustrated example, processor 1404 is connected to a bus 1402, although any communication medium can be used to facilitate interaction with other components of logical circuit 1400 or to communicate externally.

Computing system 1400 might also include one or more memory engines, simply referred to herein as main memory 1408. For example, preferably random-access memory (RAM) or other dynamic memory, might be used for storing information and instructions to be executed by processor 1404. Main memory 1408 might also be used for storing temporary variables or other intermediate information during execution of instructions to be executed by processor 1404. Logical circuit 1400 might likewise include a read only memory ("ROM") or other static storage device coupled to bus 1402 for storing static information and instructions for processor 1404.

The computing system 1400 might also include one or more various forms of information storage mechanism 1410, which might include, for example, a media drive 1412 and a storage unit interface 1420. The media drive 1412 might include a drive or other mechanism to support fixed or removable storage media 1414. For example, a hard disk drive, a floppy disk drive, a magnetic tape drive, an optical disk drive, a CD or DVD drive (R or RW), or other removable or fixed media drive might be provided. Accordingly, storage media 1414 might include, for example, a hard disk, a floppy disk, magnetic tape, cartridge, optical disk, a CD or DVD, or other fixed or removable medium that is read by, written to, or accessed by media drive 1412. As these examples illustrate, the storage media 1414 can include a computer usable storage medium having stored therein computer software or data.

In alternative embodiments, information storage mechanism 1440 might include other similar instrumentalities for allowing computer programs or other instructions or data to be loaded into logical circuit 1400. Such instrumentalities might include, for example, a fixed or removable storage unit 1422 and an interface 1420. Examples of such storage units 1422 and interfaces 1420 can include a program cartridge and cartridge interface, a removable memory (for example, a flash memory or other removable memory engine) and memory slot, a PCMCIA slot and card, and other fixed or removable storage units 1422 and interfaces 1420 that allow software and data to be transferred from the storage unit 1422 to logical circuit 1400.

Logical circuit 1400 might also include a communications interface 1424. Communications interface 1424 might be used to allow software and data to be transferred between logical circuit 1400 and external devices. Examples of communications interface 1424 might include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1424 might typically be carried on signals, which can be electronic, electromagnetic (which includes optical) or other signals capable of being exchanged by a given communications interface 1424. These signals might be provided to communications interface 1424 via a channel 1428. This channel 1428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1408, storage unit 1420, media 1414, and channel 1428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 1400 to perform features or functions of the disclosed technology as discussed herein.

Although FIG. 14 depicts a computer network, it is understood that the disclosure is not limited to operation with a computer network, but rather, the disclosure may be practiced in any suitable electronic device. Accordingly, the computer network depicted in FIG. 14 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of an engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for composing a rendered scene comprising a product 3D object and one or more associated interactive message 3D objects rendered in the scene with the product 3D object, the system comprising:
   a memory;
   a stored a set of interactive message templates;
   a 3D asset importer and management module;
   a 3D pipeline and workflow management; and
   a processor that are configured to execute machine readable instructions stored in the memory, which when executed cause the processor to:
   receive, via the 3D asset importer and management module, one or more product images for a first product;
   generate, via the 3D pipeline and workflow management, the product 3D object based on the one or more product images for the first product;

receive interactive message customization parameters for customizing an interactive message associated with the first product;

create an interactive message 3D object based on the customization parameters;

create an integrated file comprising the interactive message 3D object for the first product and the product 3D object for the first product, wherein the integrated file comprises a scaling factor that is bounded by a predetermined range of values based on a ratio; and provide the integrated file for display in the rendered scene, the rendered scene including the interactive message 3D object rendered with the product 3D object in the rendered scene.

2. The system of claim 1, wherein the customization parameters are received with a selection of at least one stored interactive message template.

3. The system of claim 1, wherein the customization parameters are received with non-templated information and offers as options to display with the product 3D object.

4. The system of claim 1, wherein the interactive message 3D object comprises a brand logo corresponding with the product 3D object.

5. The system of claim 1, wherein the processor that is configured to execute the machine readable instructions further to:

prior to providing the integrated file, provide a preview display of the interactive message 3D object and the product 3D object.

6. The system of claim 1, wherein the processor that is configured to execute the machine readable instructions further to:

provide a user with parameter controls to define segmentation, personalization, and effective dates of the interactive message 3D object.

7. The system of claim 1, wherein the processor that is configured to execute the machine readable instructions further to:

upon providing the integrated file for display in the rendered scene, initiate a tracking process using at least one of cookies, URL parameters, and offer codes to collect data pertaining to user interactions.

8. The system of claim 7, wherein the tracking process is linked to metadata from the objects or to other systems where the objects are used.

9. The system of claim 1, wherein the product 3D object is generated at a 3D-enabled display that positions the one or more product images for the first product on a grid.

10. The system of claim 9, wherein the processor that is configured to execute the machine readable instructions further to:

receive an actual size of the first product;

compare the actual size for the first product with an actual size of a second product image to determine a relative size between the first product and the second product;

identify a scaling factor based on the determined relative size; and adjust the display of the first product and the second product based on the identified scaling factor such that the first product and the second product are proportional to each other.

11. The system of claim 9, wherein the one or more product images for the first product are placed on a pivot point of the grid, wherein the pivot point is used a center of rotation and scaling for the first product.

12. The system of claim 1, wherein the integrated file comprises a scaling factor that is applied respectively to the interactive message 3D object for the first product and the product 3D object for the first product, such that the interactive message 3D object and the product 3*d* object for the first product are scaled relative to a reference size or ratio stored in the integrated file.

* * * * *